(12) United States Patent
Fish

(10) Patent No.: US 9,006,355 B1
(45) Date of Patent: Apr. 14, 2015

(54) HIGH PERFORMANCE SILICON-BASED COMPOSITIONS

(71) Applicant: Burning Bush Group, LLC, Kansas City, MO (US)

(72) Inventor: Chris Fish, Central Point, OR (US)

(73) Assignee: Burning Bush Group, LLC, Kansas City, MO (US)

( * ) Notice: Subject to any disclaimer, the term of this patent is extended or adjusted under 35 U.S.C. 154(b) by 0 days.

(21) Appl. No.: 14/275,675

(22) Filed: May 12, 2014

Related U.S. Application Data

(60) Provisional application No. 61/886,841, filed on Oct. 4, 2013.

(51) Int. Cl.
| | |
|---|---|
| *C09D 183/06* | (2006.01) |
| *C08G 77/14* | (2006.01) |
| *C09D 183/04* | (2006.01) |
| *B05D 3/02* | (2006.01) |
| *C09D 183/08* | (2006.01) |

(52) U.S. Cl.
CPC ............ *C09D 183/04* (2013.01); *B05D 3/0254* (2013.01); *C09D 183/08* (2013.01)

(58) Field of Classification Search
None
See application file for complete search history.

(56) References Cited

U.S. PATENT DOCUMENTS

| | | | |
|---|---|---|---|
| 3,445,276 A | | 5/1969 | Pikula |
| 4,349,609 A | * | 9/1982 | Takeda et al. ................. 428/429 |
| 4,562,091 A | | 12/1985 | Sachdev et al. |
| 4,685,930 A | | 8/1987 | Kasprzak |
| 4,844,986 A | | 7/1989 | Karakelle et al. |
| 5,030,699 A | * | 7/1991 | Motoyama et al. ........... 525/477 |
| 5,086,127 A | | 2/1992 | Itoh et al. |
| 5,599,892 A | | 2/1997 | Hayashida |
| 5,605,958 A | | 2/1997 | Yoneda et al. |
| 5,907,019 A | * | 5/1999 | Itoh et al. ....................... 525/477 |
| 6,284,385 B1 | * | 9/2001 | Guillaumon et al. ......... 428/450 |
| 6,706,798 B2 | | 3/2004 | Kobayashi et al. |
| 6,734,250 B2 | | 5/2004 | Azechi et al. |
| 6,756,469 B2 | | 6/2004 | Lukacs |
| 6,916,529 B2 | | 7/2005 | Pabla et al. |
| 7,527,872 B2 | | 5/2009 | Steele et al. |
| 7,687,150 B2 | * | 3/2010 | Simendinger et al. ........ 428/447 |
| 7,709,574 B2 | | 5/2010 | Wan et al. |
| 8,029,871 B2 | | 10/2011 | Nakayama et al. |
| 8,222,352 B2 | | 7/2012 | Hirano |
| 8,354,480 B2 | | 1/2013 | McAuliffe et al. |
| 8,563,409 B2 | | 10/2013 | Morita |
| 8,659,115 B2 | | 2/2014 | Lin |
| 8,710,138 B2 | | 4/2014 | Trindade et al. |
| 2003/0083453 A1 | | 5/2003 | Lukas et al. |
| 2005/0282090 A1 | | 12/2005 | Hirayama et al. |
| 2006/0194707 A1 | | 8/2006 | Lu |
| 2006/0205861 A1 | | 9/2006 | Gordon et al. |
| 2008/0015292 A1 | | 1/2008 | Lens et al. |
| 2008/0088051 A1 | * | 4/2008 | Moffett ......................... 264/129 |
| 2008/0178536 A1 | | 7/2008 | Johnson |
| 2008/0305611 A1 | | 12/2008 | Hirota |
| 2009/0253884 A1 | | 10/2009 | Ogawa et al. |
| 2010/0178521 A1 | | 7/2010 | Byrne et al. |
| 2010/0221666 A1 | | 9/2010 | Popa et al. |
| 2010/0279906 A1 | | 11/2010 | Schwarz |
| 2011/0086958 A1 | | 4/2011 | Lortz et al. |
| 2011/0195259 A1 | | 8/2011 | Song |
| 2012/0107559 A1 | | 5/2012 | Ferrar et al. |
| 2012/0252923 A1 | | 10/2012 | Serobian |
| 2013/0109824 A1 | | 5/2013 | Kim et al. |
| 2013/0302526 A1 | | 11/2013 | Fish |
| 2014/0120243 A1 | | 5/2014 | Laine et al. |

FOREIGN PATENT DOCUMENTS

| | | |
|---|---|---|
| EP | 1217058 A1 | 6/2002 |
| EP | 1597070 A1 | 2/2004 |
| EP | 1873189 A1 | 4/2006 |
| WO | 9220634 A2 | 11/1992 |
| WO | 2005108543 A1 | 11/2005 |
| WO | 2008048565 A1 | 10/2007 |
| WO | 2008134243 A1 | 11/2008 |
| WO | WO 2008/134243 * | 11/2008 |
| WO | 2013036546 A3 | 9/2012 |
| WO | 2012134788 A1 | 10/2012 |

OTHER PUBLICATIONS

KADKLAD RX23, www.kadko.com/products.html, Retrieved Jan. 14, 2014.

Dow Corning, Product Information for US-CF 2403 Resin, Feb. 20, 2013.

\* cited by examiner

*Primary Examiner* — Marc Zimmer

(74) *Attorney, Agent, or Firm* — Patrick C. Woolley; Polsinelli PC

(57) ABSTRACT

Provided herein are silicon-based compositions, which after curing is a coating composition having strong substrate adhesion and scratch resistance. The compositions are formed from a mixture of constituents comprising: from about 20% to about 90% (w/w) of a first siloxane selected from the group consisting of silsesquioxane, methylmethoxysiloxane, and combinations thereof; and from about 10% to about 80% (w/w) of one or more silicon compounds selected from the group consisting of a second siloxane, silane, and silazane. Optionally, the compositions may comprise from about 0.1% to about 5% (w/w) alkyltitanate.

21 Claims, 18 Drawing Sheets

HIGH PERFORMANCE SILICON-BASED COMPOSITIONS

CROSS-REFERENCE

This disclosure claims benefit of the filing date under 35 U.S.C. §119 to U.S. Provisional Patent Application Ser. No. 61/886,841 filed Oct. 4, 2013, and entitled "High Performance Silicon-Based Compositions," which is herein incorporated by reference in its entirety for all purposes.

TECHNICAL FIELD

The present disclosure relates to silicon-based compositions formed from a mixture of silsesquioxane, methoxymethylsiloxane, at least one of a second siloxane, silazane, or silane, and optionally an alkyltitanate. The resultant composition may be used to form coatings having resistance to oxidization and photodegradation.

BACKGROUND

Coatings are used in a wide variety of contexts to modify the surface properties of a bulk material. For example, it is beneficial for the surfaces of medical devices to resist degradation upon contact with body fluids, both to maintain the integrity of the medical device itself and to protect the patient from potentially harmful degradants and leachates originating from the coating. Coating stability is also promoted when the coating resists photodegradation, bleaching, and atmospheric oxidation. The coating should strongly adhere to its substrate, being resistant to mechanical wear and thermal stress. In some contexts, optical clarity of a cured coating is valuable, especially when the substrate itself is transparent.

SUMMARY

The silicon-based compositions described herein provide hard, heat resistant, and chemical resistant coatings that strongly bond to their substrates. These coatings resist photodegradation in visible and ultraviolet light, and resist oxidation under ambient conditions. The coatings can harden in less than a day, and, in some contexts, in less than an hour. The compositions may be used as single-component systems, resulting in a reduced unit cost compared to two-component systems. The compositions may also be cured either under ambient conditions or at an elevated temperature, without added solvent.

In particular, one aspect of the present disclosure provides a silicon-based composition, which after curing is a coating composition having strong substrate adhesion and scratch resistance. The composition is formed from a mixture of constituents comprising from about 20% to about 90% (w/w) of a first siloxane selected from the group consisting of silsesquioxane, methylmethoxysiloxane, and combinations thereof; and from about 10% to about 80% (w/w) of one or more silicon compounds selected from the group consisting of a second siloxane, silane, and silazane. Upon curing, the silicon-based compounds provide coatings that are strong, resist mechanical damage, resist chemical attack, resist UV irradiation, and are stable against oxidation.

The composition may comprise from about 45% to about 90% (w/w) of a first siloxane. The silsesquioxane may be methylsilsesquioxane. The first siloxane may comprise a combination of from about 10% to about 70% (w/w) methylsilsesquioxane and from about 10% to about 50% (w/w) methylmethoxysiloxane. The composition may further comprise from about 0.1% to about 5% (w/w) alkyltitanate. The alkyltitanate may comprise butyltitanate present in an amount ranging from about 2% to about 5% (w/w). The one or more silicon compounds may comprise from about 10% to about 50% (w/w) of the total composition. The silane may be selected from the group consisting of trimethoxysilane, triethoxysilane, aminopropylsilane, aminopropylmethyldioxysilane, and polysilane. In a particular embodiment, the first siloxane may comprise a combination of from about 10% to about 70% (w/w) methylsilsesquioxane and from about 10% to about 50% (w/w) methylmethoxysiloxane; the silicon compound may comprise a combination from about 10% to about 50% (w/w) triethoxysilane, and from about 10% to about 20% (w/w) methylphenylsilicone resin; and an alkyltitanate may comprise from about 0.5% to about 2% (w/w) butyltitanate.

Another aspect of this disclosure provides a polymer formed from the polymerization of a mixture comprising a first siloxane comprising silsesquioxane and methoxymethylsiloxane; and one or more silicon compounds selected from the group consisting of a second siloxane, silane, and silazane. The polymer comprises a siloxane ladder structure comprising a repeating unit of formula (I),

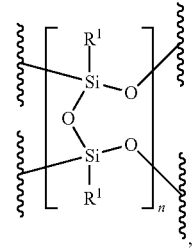

(I)

wherein each $R^1$ is hydrocarbyl, and wherein n is between 4 and 100. In particular, $R^1$ may be alkyl, such as methyl. These polymers are strong, resist mechanical damage, resist chemical attack, resist UV irradiation, and are stable against oxidation.

A further aspect of this disclosure provides a compound comprising formula (II),

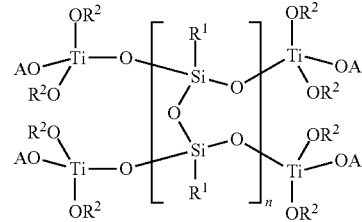

(II)

wherein:
each $R^1$ is hydrocarbyl;
each $R^2$ is alkyl;
each A is selected from the group consisting of

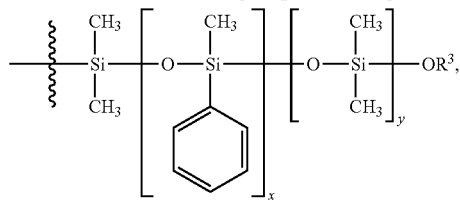

-continued

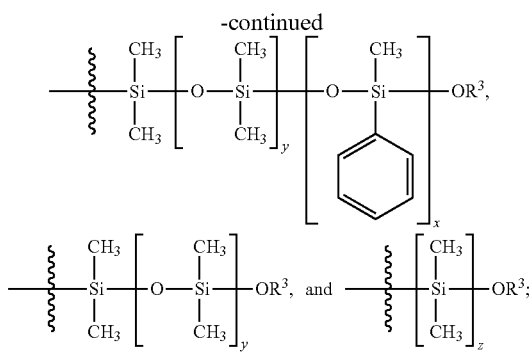

each R³ is selected from the group consisting of alkyl and SiH(OR⁴)₂;
each R⁴ is selected from the group consisting of methyl and ethyl;
n is between 4 and 100; and
x, y, and z are each between 1 and 100.

Each R¹ may be methyl. Each R² my be butyl. The numbers x, y, and z may each between 5 and 25.

In a particular embodiment of this aspect, the compound of formula (II) may comprise a compound of formula (III):

(III)

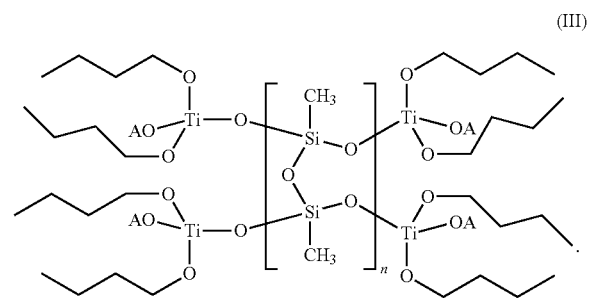

A still further aspect of this disclosure provides a method of coating a surface. A mixture of constituents is mixed to form a silicon-based coating composition comprising from about 20% to about 90% (w/w) of a first siloxane selected from the group consisting of silsesquioxane, methylmethoxysiloxane, and combinations thereof; and from about 10% to about 80% (w/w) of one or more silicon compounds selected from the group consisting of a second siloxane, silane, and silazane. This mixture is coated onto a surface. The coating is cured at a temperature from about 20° C. to about 400° C. for about 0.3 hours to about 5 days. The first siloxane may comprise a combination of from about 10% to about 70% (w/w) methylsilsesquioxane and from about 10% to about 50% (w/w) methylmethoxysiloxane; and the silicon compound may comprise a combination from about 10% to about 50% (w/w) triethoxysilane, and from about 10% to about 20% (w/w) methylphenylsilicone resin. The mixture may further comprise from about 0.1% to about 5% alkyltitanate. In some embodiments, the alkyltitanate may comprise from about 2% to about 5% (w/w) butyltitanate. In some instances, the coating may be cured at a temperature of about 20° C. to about 30° C. for about 1 day to about 5 days to form the coating composition. In other instances, the coating may be cured at a temperature of about 60° C. to about 70° C. for about 2 hours to about 24 hours to form the coating composition. In yet other instances, the coating may be cured at a temperature of about 125° C. to about 150° C. for about 1 hours to about 2 hours to form the coating composition. In still other instances, the coating may be cured at a temperature of about 300° C. to about 400° C. for about 0.3 hours to about 5 hours to form the coating composition.

Additional embodiments and features are set forth in part in the description that follows, and in part will become apparent to those skilled in the art upon examination of the specification, or may be learned by the practice of the embodiments discussed herein. A further understanding of the nature and advantages of certain embodiments may be realized by reference to the remaining portions of the specification and the drawings, which forms a part of this disclosure.

BRIEF DESCRIPTION OF THE FIGURES

In addition to the exemplary aspects and embodiments described above, further aspects and embodiments will become apparent by reference to the drawings and by study of the following descriptions.

DETAILED DESCRIPTION

Figure 1:
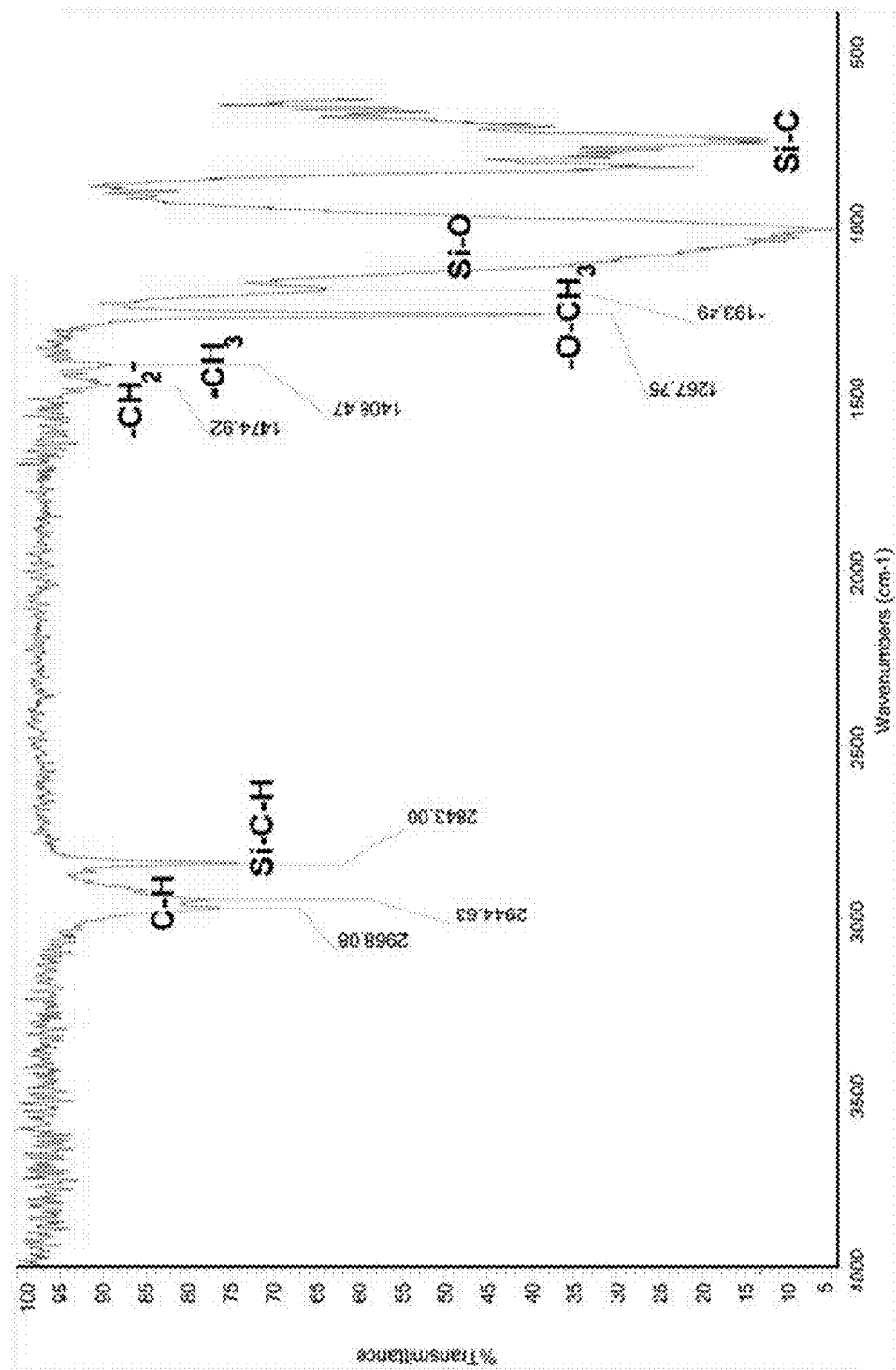
FIG. 1 depicts the Fourier transform infrared (FTIR) spectrum for Silres® MSE-100 from Wacker Chemical Corporation.

The present disclosure may be understood by reference to the following detailed description, taken in conjunction with the drawings as described above. It is noted that, for purposes of illustrative clarity, certain elements in various drawings may not be drawn to scale, may be represented schematically or conceptually, or otherwise may not correspond exactly to certain physical configurations of embodiments.

The present disclosure relates to silicon-based compositions that provide hard, heat resistant, and chemical resistant coatings that strongly bond to their substrates. These coatings, and cure quickly under ambient conditions or at an elevated temperature, without added solvent.

(I) Silicon-Based Compositions

The silicon-based compositions comprise a first siloxane selected from silsesquioxane and methylmethoxysiloxane, and one or more silicon compounds selected from the group consisting of a second siloxane, silane, and silazane. Optionally, the compositions may further comprise an alkytitanate, such as butyltitanate. The compositions may also further comprise one or more organic or inorganic substituents, non-reactive solvents, and/or one or more additives for curing or for finishing, each of which is proportioned to achieve certain properties.

(a) Siloxane

The silicon-based compositions of the present disclosure include at least one siloxane. A "siloxane" is a chemical compound having branched or unbranched backbones consisting of alternating silicon and oxygen atoms —Si—O—Si—O— with side chains R attached to the silicon atoms ($R_1R_2SiO$), where R is a hydrogen atom or a hydrocarbon group. Polymerized siloxanes, including oligomeric and polymeric siloxane units, with organic side chains (R≠H) are commonly known as polysiloxanes, or $[SiOR_1R_2]_n$, wherein n is greater than 1. The chemical structure for a linear polysiloxane is shown below:

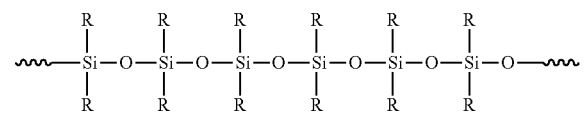

In addition to hydrogen, $R_1$ and $R_2$ of the polysiloxane may be independently selected from the group consisting of alkyl, alkenyl, cycloalkyl, alkylamino, aryl, aralkyl, and alkylsilyl. Thus, $R_1$ and $R_2$ may be, for example, methyl, ethyl, propyl, butyl, octyl, decyl, vinyl, allyl, butenyl, octenyl, decenyl, tetradecyl, hexadecyl, eicosyl, tetracosyl, cyclohexyl, methylcyclohexyl, methylamino, ethylamino, phenyl, tolyl, xylyl, naphthyl, benzyl, methylsilyl, ethylsilyl, propylsilyl, butylsilyl, octylsilyl, or decylsilyl. These alkyl, alkenyl, cycloalky, aryl, alkyl amino, aralkyl and alkylsilyl groups may each optionally be substituted by one or more substituents which contain heteroatoms, such as halides, like chlorine, bromine and iodine; alkoxy groups, such as ethoxy; or acyl groups, such as acetyl and propionyl. Organic side groups can be used to link two or more of these —Si—O— backbones together. By varying the —Si—O— chain lengths, side groups, and crosslinking, polysiloxanes can vary in consistency from liquid to gel to rubber to hard plastic. Representative examples of polysiloxane are $[SiO(CH_3)_2]_n$ (polydimethylsiloxane, PDMS), $[SiO(C_6H_5)_2]_n$ (polydiphenylsiloxane), and polyphenylmethylsiloxane $(CH_3SiO_{1.5})_x(C_6H_5SiO_{1.5})_y$. In some embodiments, the silicon-based composition comprises a polydimethylsiloxane. The chemical structure for polydimethylsiloxane is shown below:

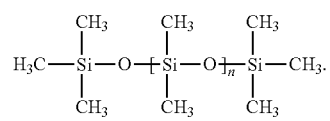

In some embodiments, the siloxane may be octamethyltrisiloxane, $[(CH_3)_3SiO]_2Si(CH_3)_2$, a linear siloxane in the polydimethylsiloxane family with the INCI name of trisiloxane. The chemical structure for octamethyltrisiloxane is shown below:

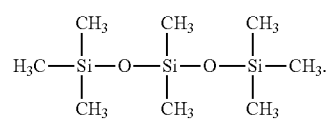

In other embodiments, the siloxane may be a methoxymethylsiloxane, such as Silres® MSE-100 (Wacker Chemical Corporation), consisting of 1 to 10 repeating dimethylsiloxane units. The FTIR spectrum for Silres® MSE-100 at FIG. 1 indicates low concentrations (<2 ppm) of residual toluene and methanol in the bulk material. The chemical structure for Silres® MSE-100 is shown below:

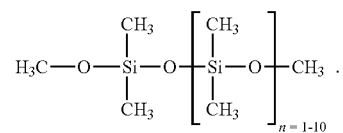

In still other embodiments, the siloxane may be Silres® MK (Wacker Chemical Corporation), consisting of 10 to 100 repeating dimethylsiloxane units. The chemical structure for Silres® MK is shown below:

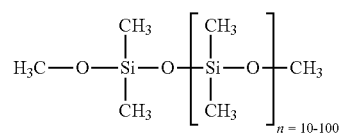

Other methylated siloxanes include, but are not limited to, Dow 3074 intermediate methylsiloxane, hexamethyldisiloxane, cyclotetrasiloxane, octamethylcyclotetra-siloxane, decamethyltetrasiloxane, and decamethylcyclopentasiloxane. The method of producing high molecular weight polysiloxane product was disclosed in U.S. App. Pub. 2009/0253884, which is incorporated herein by reference. In addition, polysiloxane is also commercially available. As one example, polysiloxane, specifically, polydimethylsiloxane, may be supplied in isopropyl acetate solvent by Genesee Polymers Corp. (Burton, Mich.), dimethyl silicone fluids G-10. In some exemplary embodiments, the siloxane may be Techneglas™ GR-908F produced by Techneglas, LLC, Perrysburg, Ohio USA and consisting of 98-99 wt. % polyphenylmethylsiloxane $((CH_3SiO_{1.5})_x(C_6H_5SiO_{1.5})_y$, CAS Reg. No. 67763-03-5) in 1-2 wt. % ethanol. In other embodiments, the siloxane Wacker Silres™ SY 409, a methylphenylsilicone resin, as shown below:

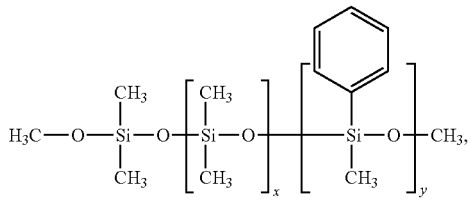

where x and y may each be between 5 and 25.

In other embodiments, the siloxane may comprise silsesquioxane, methylmethoxysiloxane, or combinations thereof. Silsesquioxanes are caged organosilicon compounds with the empirical formula of $RSiO_{3/2}$, wherein R is a hydrocarbyl. In various embodiments, the R is an alkyl, such as methyl. Typically, cages of 6-14 silicon atoms and 9-21 oxygen atoms may coexist. A non-limiting example of methylsilsesquioxane a cage formed by eight silicon atoms and twelve oxygen atoms, as shown below:

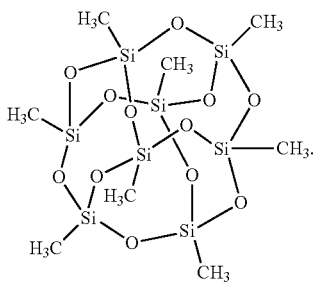 [SMILES: C[Si]12O[Si]3(C)O[Si]4(C)O[Si](C)(O1)O[Si]1(C)O[Si](C)(O2)O[Si](C)(O3)O[Si](C)(O4)O1]

Once reacted, silsesquioxanes form a tightly interwoven and highly polymeric network. Silsequioxane and the networks they form are generally not soluble in water. The final material may be substantially free of solvents and non-toxic. These final materials are especially well-suited from medical applications where the presence of unwanted solvents and toxic agents could be harmful to the patient.

The polysiloxane may be used as provided by the manufacturer. Generally, the amount of polysiloxane used in the silicon-based compositions is from about 15% and about 90% (w/w) of the total formula weight of silicon-based composition. In some embodiments, polysiloxane may comprise about 15%, 16%, 17%, 18%, 19%, 20%, 21%, 22%, 23%, 24%, 25%, 26%, 27%, 28%, 29%, 30%, 31%, 32%, 33%, 34%, 35%, 40%, 45%, 50%, 55%, 60%, 65%, 70%, 75%, 80%, 85%, or 90% (w/w), or any range thereof, of the silicon-based composition. For example, the amount of polysiloxane present in the silicon-based composition may range from about 15% to about 20%, from about 20% to about 25%, from about 25% to about 30%, from about 30% to about 35%, from about 35% to about 40%, from about 40% to about 45%, from about 45% to about 50%, from about 50% to about 55%, from about 55% to about 60%, from about 60% to about 65%, from about 65% to about 70%, from about 70% to about 75%, from about 75% to about 80%, from about 80% to about 85%, or from about 85% to about 90% (w/w) of the total composition. In some embodiments, the polysiloxane may comprise less than 90% (w/w) of the total composition. In other embodiments, the polysiloxane may comprise less than 80% (w/w) of the total composition. In some other embodiments, the polysiloxane may comprise less than 60% (w/w) of the total composition. In still other embodiments, the polysiloxane may comprise more than 20% (w/w) of the total composition. In yet other embodiments, the polysiloxane may comprise more than 60% (w/w) of the total composition. In still yet other embodiments, the polysiloxane may comprise more than 80% (w/w) of the total composition.

Generally, the amount of silsesquioxane used in the silicon-based compositions is from about 10% and about 70% (w/w) of the total formula weight of silicon-based composition. In some embodiments, the silsesquioxane may comprise about 10%, 15%, 20%, 21%, 22%, 23%, 24%, 25%, 26%, 27%, 28%, 29%, 30%, 31%, 32%, 33%, 34%, 35%, 40%, 45%, 50%, 55%, 60%, 65%, or 70% (w/w), or any range thereof, of the silicon-based composition. For example, the amount of silsesquioxane present in the silicon-based composition may range from about 10% to about 15%, from about 15% to about 20%, from about 20% to about 25%, from about 25% to about 30%, from about 30% to about 35%, from about 35% to about 40%, from about 40% to about 45%, from about 45% to about 50%, from about 50% to about 55%, from about 55% to about 60%, from about 60% to about 65%, or from about 65% to about 70% (w/w) of the total composition. In some embodiments, the silsesquioxane may comprise less than 70% (w/w) of the total composition. In other embodiments, the silsesquioxane may comprise less than 30% (w/w) of the total composition. In still other embodiments, the silsesquioxane may comprise more than 10% (w/w) of the total composition. In yet other embodiments, the silsesquioxane may comprise more than 30% (w/w) of the total composition.

Generally, the amount of methylmethoxysiloxane used in the silicon-based compositions is from about 10% and about 50% (w/w) of the total formula weight of silicon-based composition. In some embodiments, the methylmethoxysiloxane may comprise about 10%, 15%, 20%, 21%, 22%, 23%, 24%, 25%, 26%, 27%, 28%, 29%, 30%, 31%, 32%, 33%, 34%, 35%, 40%, 45%, or 50% (w/w), or any range thereof, of the silicon-based composition. For example, the amount of methylmethoxysiloxane present in the silicon-based composition may range from about 10% to about 15%, from about 15% to about 20%, from about 20% to about 25%, from about 25% to about 30%, from about 30% to about 35%, from about 35% to about 40%, from about 40% to about 45%, or from about 45% to about 50% (w/w) of the total composition. In some embodiments, the methylmethoxysiloxane may comprise less than 50% (w/w) of the total composition. In other embodiments, the methylmethoxysiloxane may comprise less than 20% (w/w) of the total composition. In still other embodiments, the methylmethoxysiloxane may comprise more than 10% (w/w) of the total composition. In yet other embodiments, the methylmethoxysiloxane may comprise more than 20% (w/w) of the total composition.

(b) Silazane

The silicon-based compositions of the present disclosure, prior to curing, may include a silazane constituent. "Silazane" and "polysilazane," as appearing in the specification and claims are generic terms intended to include compounds, which contain one or more silicon-nitrogen bonds in which the nitrogen atom is bonded to at least two silicon atoms, and may or may not contain cyclic units. Therefore, the terms "polysilazane" and "silazane polymer" include monomers, oligomers, cyclic, polycyclic, linear polymers or resinous polymers having at least one Si—N group in the compound, or having repeating units of $H_2Si$—NH; that is, $[H_2Si-NH]_n$, with "n" greater than 1. The chemical structure for polysilazane is shown below:

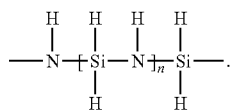

An example of silazane oligomer is disilazane $H_3Si$—NH—$SiH_3$. The oligomeric or polymeric silazanes may be amorphous or crystalline. Silazane polymer chains having both large chains and small rings with a wide range of molecular mass are called "polysilazanes." Exemplary polysilazane or a mixture of polysilazanes include, but are not limited to, silazanes, disilazanes, polysilazanes, ureasilazanes, polyureasilazanes, aminosilanes, organosilazanes, organopolysilazanes, inorganic polysilazanes, and others employing liquid anhydrous ammonia in their production. A polysilazane with the general formula $(CH_3)_3Si$—NH—$[(CH_3)_2Si$—$NH]_n$—$Si(CH_3)_3$ is designated as polydimethylsilazane. One group of polysilazane, $[R_1R_2Si$—$NH]_n$, is isoelectronic with and close relatives to polysiloxane $[R_1R_2Si$—$O]_n$. Additionally, Si—N bond can be found in triethylsilylamine $((H_5C_2)_3Si$—$NH_2)$, which is a typical aminosilane. Further, small ring-shaped molecules with a basic group of Si—N are called "cyclosilazanes." For example, triazatrisilane $(H_9N_3Si_3)$ is a typical cyclotrisilazane.

A silazane constituent is commonly produced by ammonolysis of a halosilane, such as a chlorosilane or an organochlorosilane. In this process, the nitrogen nucleophilically attacks the carbon alpha to the chlorine, forming a new Si—N bond and releasing hydrochloric acid (HCl) as a byproduct. The HCl then reacts with excess ammonia in the reaction mixture, producing ammonium chloride. Because of the ammonolysis process, the silicon and nitrogen atoms have a preferable distribution within the cured resin.

If the silazane is not properly isolated after synthesis, the silazane constituent may contain residual ammonia reactant, free amine from side reactions, and ammonium chloride byproduct. These nitrogen-containing materials are undesirable at least because of their environmental toxicity. Also, the first- and second-order elimination reactions may lead to alkyl and vinyl substituents, producing, for example, chloromethylvinylsilane, chlorodivinylsilane, dichloroethylvinylsilane, chloromethyldivinylsilane, etc., depending on the organochlorosilane starting material. Before curing, the vinyl groups in particular can react with low molecular weight compounds and facilitate polymerization. These polymerization reactions increase the chain length and the degree of three-dimensional crosslinking of the polymer networks in the cured coatings. As a result, they may have much higher mass ranges and significantly improved material properties.

For polymerized silicon-based compositions, ammonia may be used to dissolve and age the materials, which must be carefully regulated through venting to control the molecular weight of the resin starting material. This reaction results in a $R_3Si$—$NH_2$ group to form silazane units by releasing ammonia. High moisture and/or water cause decomposition of the polymerized silicon-based material, due to the water molecule attacking the silicon atoms and the Si—N bonds are then severed. This reaction produces a $R_3Si$—$NH_2$ and $HO$—$SiR_3$ which further react to form $R_3Si$—O—$SiR_3$ siloxane. The polymerized liquid is clear to translucent, colorless to pale yellow, and may form a solid. Exposure to higher temperature and/or sunlight can also increase the mass of the polymerized liquid by encouraging further thermal or photochemical polymerization. In the liquid form, trace elements, free ammonia and ammonium chloride can often be detected.

Polysilazanes usually do not vaporize due to the strong molecular interactions. Heat promotes crosslinking of the polysilazanes to form even higher molecular weight structures. For example, at temperatures of 100-300° C., hydrogen evolves and ammonia promotes further crosslinking. As provided in the present disclosure, vinyl substituents promote continued crosslinking, increased molecular strength, and conversion of liquid resins into solids. Once temperatures reach 700-1200° C., the multi-dimensional amorphous network with Si, C and N atoms is formed, resulting in a SiCN ceramic. This "pyrolysis" of polysilazanes produces ceramic materials with low viscosity in high yield. This also makes the polysilazanes an excellent choice for precursors for other ceramic matrices. As provided in the present disclosure, polymers combined with low molecular weight components offer added value for the generation of resistant and fast-curing coatings, because new chains can be formed that can improve and enhance the resulting material properties.

Alternatively, polysilazane may be commercially available. For example, polysilazane (<99%) in tert-butyl acetate solvent is a resin having 100% solids as a liquid of low viscosity. This liquid polysiloxazane-based coating may comprise more than 99% polysilazane, with less than 5% cyclosilazane, a cyclic form of polysilazane. A similar product is also available from other manufacturers. In other embodiments, the silazane may be DT-6062, DT-6063, or combinations thereof.

Silazane may comprise from about 0% and about 76% (w/w) of the total formula weight of silicon-based compositions. In some embodiments, silazane may comprise about 76%, 70%, 65%, 62%, 57%, 52%, 47%, 42%, 37%, 32%, 27%, 22%, 12%, 10%, 8%, 5%, 4%, 3%, 2%, 1% (w/w), or any range thereof, of the silicon-based composition. For example, the amount of silazane present in the silicon-based composition may range from about 1% to about 3%, from about 2% to about 4%, from about 4% to about 6%, from about 5% to about 8%, from about 6% to about 9%, from about 7% to about 10%, from about 8% to about 11%, from about 9% to about 12%, from about 10% to about 15%, from about 12% to about 22%, from about 18% to about 28%, from about 25% to about 35%, from about 32% to about 42%, from about 40% to about 50%, from about 48% to about 58%, from about 55% to about 65%, from about 60% to about 70%, from about 68% to about 76% (w/w), of the total composition. In an exemplary embodiment, the amount of silazane present in the composition may be from about 2% to about 8%, (w/w) of the total composition. In another exemplary embodiment, the amount of silazane present in the composition may be about 4% (w/w) of the total composition.

(c) Silane

The silicon-based compositions of the present disclosure may further include a silane. Silanes are compounds which contain one or more silicon-silicon bonds. Polysilanes $[R_1R_2Si$—$R_1R_2Si]_n$ are a large family of inorganic polymers. The number of repeating units, n, determines the molecular weight and viscosity of the composition. $R_1$ and $R_2$ may be independently selected from the group consisting of hydrogen, alkyl, alkenyl, cycloalkyl, alkylamino, aryl, aralkyl, or alkylsilyl. Thus, $R_1$ and $R_2$ may be, for example, methyl, ethyl, propyl, butyl, octyl, decyl, vinyl, allyl, butenyl, octenyl, decenyl, tetradecyl, hexadecyl, eicosyl, tetracosyl, cyclohexyl, methylcyclohexyl, methylamino, ethylamino, phenyl, tolyl, xylyl, naphthyl, benzyl, methylsilyl, ethylsilyl, propylsilyl, butylsilyl, octylsilyl, or decylsilyl. A polymer with the general formula —[(CH$_3$)$_2$Si—(CH$_3$)$_2$Si]—$_n$, is designated as polydimethylsilane. The chemical structure of polydimethylsilane is shown below:

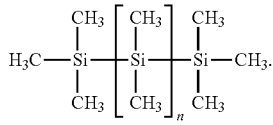

High molecular weight polysilane product with a narrow molecular weight distribution may be obtained by the process of U.S. Pat. No. 5,599,892, which is incorporated herein by reference. Polysilane is also available as a resin system supplied in amyl acetate blend from Kadko, Inc. (Beech Grove, Ind.), and it is sold as a KADKLAD R2X3™ product. Polysilane as provided in the form of KADKLAD R2X3 resin may comprise from about 1% and about 9% (w/w) of the total formula weight of silicon-based compositions. In exemplary embodiments, the silicon-based composition may comprise trimethoxysilane, triethoxysilane (TEOS), aminopropylsilane, aminoproyplmethyldioxysilane, and polysilane. In other embodiments, the mixture may comprise a silane, such as triethoxysilane (TEOS), shown below:

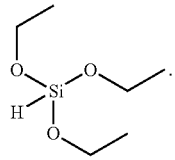

In one embodiment, the silicon-based composition does not contain silane. Generally, the amount of silane in the silicon-based composition ranges from 5% to 80% (w/w). In some embodiments, silane may comprise about of the total formula weight of silicon-based composition. In some embodiments, silane may comprise about 5% 6%, 7% 8%, 9%, 9.9%, 10%, 15%, 16%, 17%, 18%, 19%, 19.9%, 35%, 36%, 37%, 38%, 39%, 39.9%, 40%, 75%, 76%, 77%, 78%, 79%, 79.9%, or 80% (w/w), or any range thereof, of the silicon-based composition. For example, the amount of silane present in the silicon-based composition may range from about 5% to about 10%, from about 10% to about 15%, from about 15% to about 20%, from about 20% to about 25%, from about 25% to about 30%, from about 30% to about 35%, from about 35% to about 40%, from about 40% to about 45%, from about 45% to about 50%, from about 50% to about 55%, from about 55% to about 60%, from about 60% to about 65%, from about 65% to about 70%, from about 70% to about 75%, or from about 75% to about 80% (w/w) of the total composition. In some embodiments, the silane may comprise less than 80% (w/w) of the total composition. In other embodiments, the silane may comprise less than 40% (w/w) of the total composition. In some other embodiments, the silane may comprise less than 20% (w/w) of the total composition. In still some other embodiments, the silane may comprise less than 10% (w/w) of the total composition. In still other embodiments, the silane may comprise more than 5% (w/w) of the total composition. In yet other embodiments, the silane may comprise more than 15% (w/w) of the total composition. In still yet other embodiments, the silane may comprise more than 35% (w/w) of the total composition. In some embodiments, the silane may comprise more than 75% (w/w) of the total composition.

(d) Solvent

The silicon-based compositions of the current disclosure may additionally include one or more solvents. The solvent may be a polar protic solvent, a polar aprotic solvent, or a nonpolar solvent. Non-limiting examples of suitable protic polar solvents include water; alcohols such as methanol, ethanol, isopropanol, n-propanol, isobutanol, n-butanol, s-butanol, t-butanol, and the like; diols such as propylene glycol; organic acids such as formic acid, acetic acid, and so forth; amides such as formamide, acetamide, and the like; and combinations of any of the above. Non-limiting examples of suitable aprotic solvents include acetone, acetonitrile, diethoxymethane, N,N-dimethylformamide (DMF), dimethyl sulfoxide (DMSO), N,N-dimethylpropanamide (or dimethylpropionamide; DMP), 1,3-dimethyl-3,4,5,6-tetrahydro-2(1H)-pyrimidinone (DMPU), 1,3-dimethyl-2-imidazolidinone (DMI), 1,2-dimethoxyethane (DME), dimethoxymethane, bis(2-methoxyethyl)ether, N,N-dimethylacetamide (DMA), N-methyl-2-pyrrolidinone (NMP), 1,4-dioxane, ethyl formate, formamide, hexachloroacetone, hexamethylphosphoramide, methyl acetate, N-methylacetamide, N-methylformamide, methylene chloride, methoxyethane, morpholine, nitrobenzene, nitromethane, propionitrile, pyridine, sulfolane, tetramethylurea, tetrahydrofuran (THF), 2-methyl tetrahydrofuran, tetrahydropyran, trichloromethane, and combinations thereof. Representative nonpolar solvents include, but are not limited to, alkane and substituted alkane solvents (including cycloalkanes), aromatic hydrocarbons, esters, ethers, ketones, and combinations thereof. Specific polar protic solvents that may be employed include, for example, methanol, ethanol, n-propanol, isopropanol, n-butanol, tert-butanol, amyl alcohol, pentyl alcohol, isoamyl alcohol, and combinations thereof.

In exemplary embodiments, the solvent may comprise n-butanol, methyl acetate, tert-butyl acetate, isopropyl acetate, isoalkanes, and combinational thereof. The ratio of solvents may be selected to control the dry time of the silicon-based composition, especially under cooler ambient temperatures. In other embodiments, the solvent may be IsoPar™ G (isoalkanes, hydrotreated heavy naphta, ExxonMobil) used in combination with tert-butyl acetate. The ratio of IsoPar™ G to tert-butyl acetate may be selected to extend the dry time of the silicon-based composition in hotter ambient temperatures.

In general, the organic solvent comprises from about 0% to about 98% (w/w) of the silicon-based composition. In some embodiments, the solvent may comprise about 98%, about 95%, about 90%, about 85%, about 80%, about 75%, about 70%, about 65%, about 60%, about 55%, about 40%, about 35%, about 30%, about 25%, about 20%, about 15%, about 10%, or about 5% (w/w) of the total composition.

(e) Additives

The silicon-based compositions of the current disclosure may further comprise one or more additives, including, but not limited to curing agents, pigments, tracing dyes, fillers, flow control agents, dry flow additives, anti-cratering agents, surfactants, texturing agents, light stabilizers, matting agents, photosensitizers, wetting agents, anti-oxidants, plasticizers, opacifiers, stabilizers, ceramic microspheres, slip agents, dispersing agents, mica pigments, and surface altering additives. Additives typically comprise less than about 30% of the total silicon-based composition. In some embodiments, the additive comprises about 30%, about 25%, about 20%, about 15%, about 10%, about 9%, 8%, 7%, 6%, 5%, 4%, 3%, 2%, 1%, 0.1%, or 0% (w/w) of the total composition.

(i) Enhancer/Hardeners

In some embodiments of the present disclosure, each polymer in the composition can be cured independently without the need of forming co-polymers. In other embodiments, substances or mixtures of substances may be added to a resin to promote or control the curing reaction, for example curing agents such as catalysts, enhancers, and hardeners. As is generally known in the art, curing enhancers increase the rate of a chemical reaction as an initiator. The enhancer is added in a small quantity as compared to the amounts of primary reactants, and does not become a component part of the chain. In contrast, curing hardener, often an amine, enables the formation of a complex three-dimensional molecular structure by chemical reaction between the polymers and the amine. It is essential that the correct mix ratio is obtained between resin and hardener to ensure that a complete reaction takes place, such that no unreacted resin or hardener will remain within the matrix to affect the final properties after cure. Conventional polyamine hardeners comprise primary or secondary amine groups. A polysilazane-modified polyamine hardener was described in U.S. Pat. No. 6,756,469 (incorporated herein by reference), providing heated polyamine in the presence of a polysilazane to prepare a hardener imparting enhanced high temperature properties, higher char yields, and better adhesion properties.

In a particular embodiment, vinyl groups present in the silicon-based constituents may act as reaction promoters, increasing the rate and extent of polymerization of the coating during curing. The vinyl groups may be present in any one or more of the constituents of the silicon-based compositions, for example, within the silazane, siloxane, or silane constituent. During polymerization, the vinyl groups are substantially consumed, forming new covalent bonds within crosslinked polymer network of the cured coating. The concentration and distribution of vinyl groups within the coating.

Figure 2:
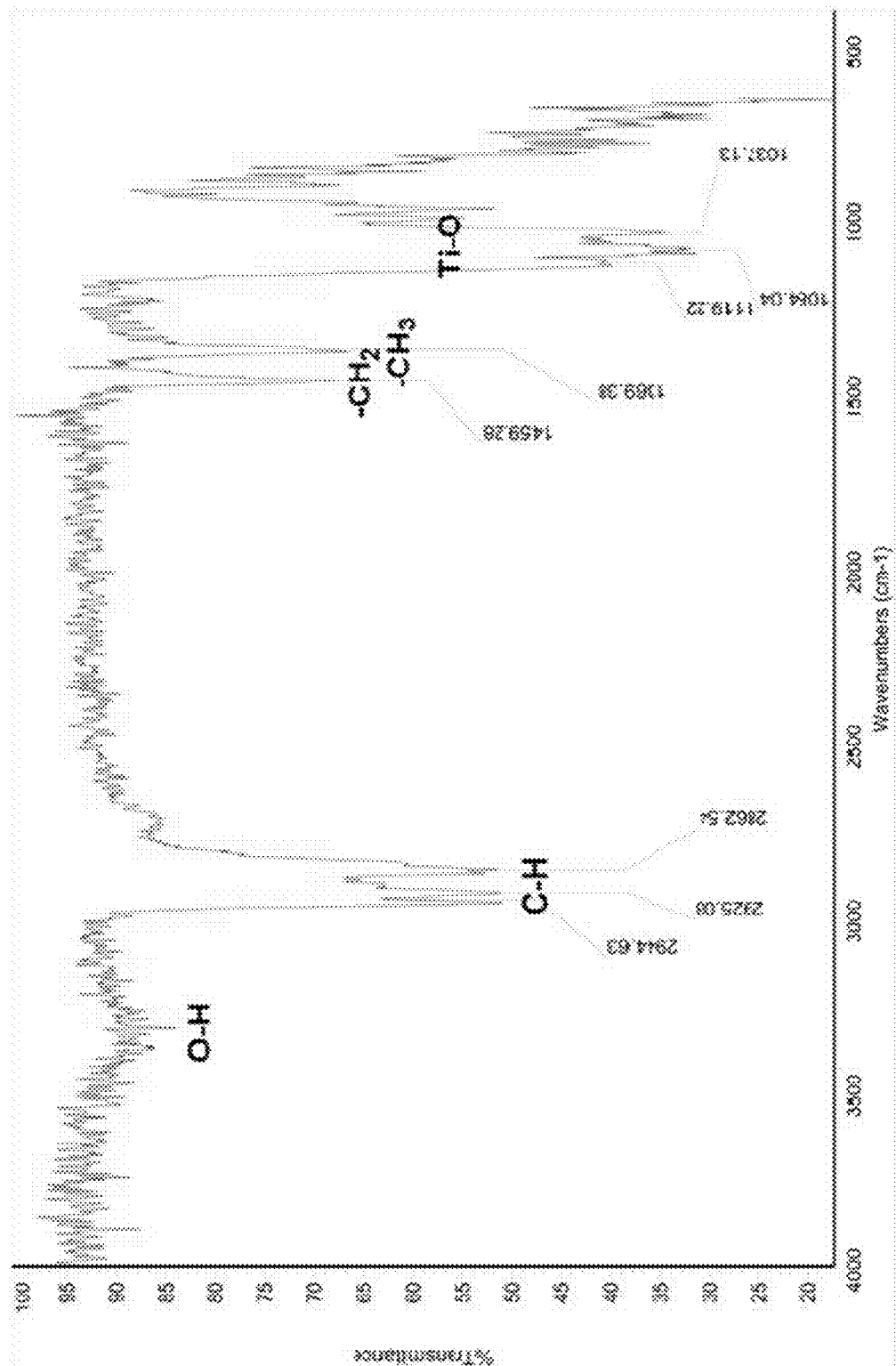
FIG. 2 depicts the FTIR spectrum for the Tyzor™ BTP polymeric butyltitanate.

In other embodiments, the enhancer may be an alkyltitanate, such as a polymeric butyltitanate (also referred to as a titanium butanolate polymer), for example Tyzor™ BTP, consisting of 5 to 25 dibutoxytitanate repeating units. The FTIR spectrum for Tyzor™ BTP is depicted at FIG. 2 and indicates low concentrations (<2 ppm) of residual toluene and methanol in the bulk material. The structure of Tyzor™ BTP is shown below:

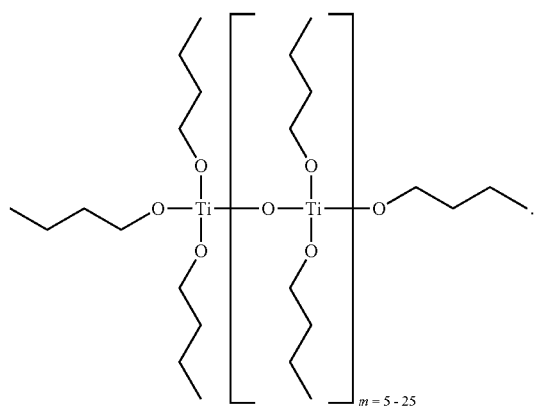

In other embodiments, the alkyltitanate may be a non-polymeric butyltitanate, such as Tyzor™ TnBP. When used, the Tyzor™ TnBP may have a concentration of 0.5 wt. % to 2 wt. % of the total resin weight. Monomeric butyltitante results faster curing shortened by about 20 to about 30 minutes compared to using a polymeric butyltitanate, depending on the formulation. The butyltitanate may be provided in a polar solvent, such as an alcohol, for example n-butanol. While the alkyltitanate is non-volatile, n-butanol has a vapor pressure of <7 hPa (<5 mmHg) at 25° C. (77° F.) and is flammable, with a flash point of 68° C. (154° F.). The butyltitanate may be hydrolyzed, rendering the material non-reactive and resulting in non-toxic titanium dioxide. Typically, a detectable amount of water, such as humidity from the atmosphere, allows the butyltitanate to react with a siloxane, such as a silsesquioxane or a methylmethoxysiloxane (Silres®).

The amount of alkyltitanate in the silicon-based composition can and will vary. Generally, the concentration of alkyltitanate ranges from about 0.1% to about 10% (w/w) of the total composition. In exemplary embodiments, the concentration of alkyltitanate may range from about 0.1% to about 0.5%, about 0.5% to about 1%, about 1% to about 2%, about 2% to about 3%, about 3% to about 4%, about 4% to about 5%, about 5% to about 6%, about 6% to about 7%, about 7% to about 8%, about 8% to about 9%, or about 9% to about 10% (w/w). In some embodiments, the alkyltitanate may comprise less than 10% (w/w) of the total composition. In other embodiments, the alkyltitanate may comprise more than 0.1% (w/w) of the total composition. In particular embodiments, the concentration of alkyltitanate may range from about 0.1% to about 5% (w/w). In other particular embodiments, the concentration of alkyltitanate may range from about 2% to about 5% (w/w). In still other particular embodiments, the concentration of alkyltitanate may range from about 0.5% to about 2% (w/w).

(ii) Substituents

The silicon-based compositions of the current disclosure may further include one or more organic or inorganic substituents. The optional organic or inorganic substituents may be added to introduce reactive groups into the reaction and thus to the copolymer. For example, by selecting the organochlorosilanes used, the polymerizable side chains of the copolymer may vary. Suitable organochlorosilanes that may be added include, but not limited to, chloromethylvinylsilane, chlorodivinylsilane, dichloroethylvinylsilane, dichloromethylvinylsilane, and chloroethylmethyldivinylsilane. When present, vinyl groups may react with other compounds of low molecular weight that are mixed with the constituents before curing. These changes in the reaction process increase the chain length and the degree of three-dimensional crosslinking of the resulting macromolecule-networks. As a result, they have much higher mass ranges and significantly improved material properties.

(iii) Matting Agents

The matting agents used in the practice of this disclosure typically can alter the surface of a coating in such a way that the light falling on it is scattered in a defined fashion. The matting agent particles stand out from the coating, and are invisible to the human eye. The color of the coating is not affected to any great extent. Representative examples of such matting agents include inorganic matting agents such as silica-based Acematt® matting agents from Evonik Degussa (Parsippany, N.J.) and silica-based matting agents available from Ineos Silicas (Hampshire, United Kingdom). The matting agents may vary in size and include materials that are micron sized particles. For example, the particles may have an average diameter of from about 0.1 to 1000 microns, and in one embodiment from 0.1 to 100 microns. Combinations of matting agents may be used.

(II) Polymers Formed from Silicon-Based Compositions

In various embodiments, the present disclosure also provides a silicon-based polymer, comprising a siloxane ladder structure. The polymer is formed from the polymerization of a mixture comprising silsesquioxane, and one or more silicon compounds selected from the group consisting of a second siloxane, silane, and silazane. The constituents of the mixture are as described above in Section (I), and may optionally comprise an alkyltitanate.

In exemplary embodiments, the silsesquioxane may be methylsilsesquioxane. In other embodiments, the mixture may further comprise methylmethoxysiloxane. In some embodiments, the alkyltitanate may be butyltitanate present in a enhancer-effective amount. In particular embodiments, the mixture may comprise from about 2% to about 5% butyltitanate (w/w).

In particular, the polymer may comprise a siloxane ladder structure comprising a repeating unit of formula (I),

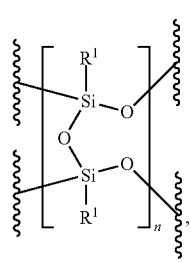

wherein each $R^1$ is hydrocarbyl, and wherein n is between 4 and 100.

In some embodiments, each $R^1$ may be alkyl. In other embodiments, each $R^1$ may be $C_1$-$C_{20}$ alkyl. In some other embodiments, each $R^1$ may be $C_1$-$C_{10}$ alkyl. In still other embodiments, each $R^1$ may be $C_1$-$C_8$ alkyl. In yet other embodiments, each $R^1$ may be selected from the group consisting of methyl, ethyl, propyl, and butyl. In exemplary embodiments, each $R^1$ may be methyl.

The number n may range from 1 to 100, such as 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100. In some embodiments, n is less than 100. In some other embodiments, n is greater than 1. In exemplary embodiments, n is 4.

(III) Method for Forming a Silicon-Based Composition

In various embodiments, the present disclosure provides a method for forming a silicon-based polymer comprising a siloxane ladder structure. In particular, the method may be used to apply or form a coating a surface. The method comprises (a) mixing a mixture of constituents to form a silicon-based coating composition comprising from about 20% to about 90% (w/w) of a first siloxane selected from the group consisting of silsesquioxane, methylmethoxysiloxane, and combinations thereof; and from about 10% to about 80% (w/w) of one or more silicon compounds selected from the group consisting of a second siloxane, silane, and silazane. (b) The mixture is coated onto a surface, and (c) the coating is cured at a temperature from about 20° C. to about 400° C. for about 0.3 hours to about 5 days.

In some embodiments, the first siloxane may comprise a combination of from about 10% to about 70% (w/w) methylsilsesquioxane and from about 10% to about 50% (w/w) methylmethoxysiloxane; the silicon compound may comprise a combination of from about 10% to about 50% (w/w) triethoxysilane, and from abot 10% to about 20% methylphenylsiloxane resin; and an alkyltitanate may comprise from about 0.5% to about 2% (w/w) butyltitanate. Further ratios and variations may be as described above in Section (I).

The curing step may be conducted at a temperature that ranges from about 20° C. to about 400° C. In one embodiment, the temperature of the reaction may range from about 20° C. to about 30° C., from about 30° C. to about 40° C., from about 40° C. to about 50° C., from about 50° C. to about 60° C., from about 60° C. to about 70° C., from about 70° C. to about 80° C., from about 80° C. to about 90° C., from about 90° C. to about 100° C., from about 100° C. to about 125° C., from about 125° C. to about 150° C., from about 150° C. to about 200° C., from about 200° C. to about 250° C., from about 250° C. to about 300° C., from about 300° C. to about 350° C., or from about 350° C. to about 400° C. In some embodiments, the temperature may range from about 20° C. to about 30° C. In some embodiments, the temperature may range from about 60° C. to about 120° C. In some embodiments, the temperature may range from about 60° C. to about 70° C. In other embodiments, the temperature may range from about 300° C. to about 400° C. In still other embodiments, the temperature may less than about 400° C. In some other embodiments, the temperature may more that about 20° C. In some other embodiments, the temperature may more that about 50° C. The reaction may be performed under ambient pressure or in an inert atmosphere (e.g., nitrogen or argon).

The curing step may be conducted over a time that ranged from about 0.3 hours to about 5 days. In one embodiment, the time of the reaction may range from about 0.3 hours to about 0.5 hours, from about 0.5 hours to about 1 hour, from about 1 hour to about 2 hours, from about 2 hours to about 4 hours, from about 4 hours to about 6 hours, from about 6 hours to about 8 hours, from about 8 hours to about 10 hours, from about 10 hours to about 12 hours, from about 12 hours to about 14 hours, from about 14 hours to about 16 hours, from about 16 hours to about 18 hours, from about 18 hours to about 20 hours, from about 20 hours to about 22 hours, from about 22 hours to about 24 hours, about 1 day, about 2 days, about 3 days, about 4 days, or about 5 days. In other embodiments, the time may range from about 1 day to about 5 days. In some embodiments, the time may range from about 2 hours to about 24 hours. In other embodiments, the time may range from about 0.3 hours to about 5 hours. In other embodiments, the time may range from about 1 hour to about 3 hours. In still other embodiments, the time may be less than 24 hours. In yet other embodiments, the time may be more than 0.3 hours.

In some instances, the coating may be cured at a temperature of about 20° C. to about 30° C. for about 1 day to about 5 days to form the coating composition. In some instances, the coating may be cured at a temperature of about 60° C. to about 70° C. for about 2 hours to about 24 hours to form the coating composition. In some instances, the coating may be cured at a temperature of about 60° C. to about 120° C. for about 1 hour to about 2 hours to form the coating composition. In other instances, the coating may be cured at a temperature of about 300° C. to about 400° C. for about 0.3 to about 5 hours to form the coating composition.

(IV) Coatings of Silicon-Based Compositions

The silicon-based compositions described herein may be further processes for a variety of applications, including forming coatings.

The resin may be applied by dipping, spraying, brushing, painting, wiping, immersion, or spin-coating techniques. These procedures typically provide polymer coatings of thicknesses on the order of 1 µm or thinner, to up to about 75 µm per coat for the cured polymers. If a thicker coating is desired, multiple coating layers may be provided. The resins as provided herein result in a coating transparent and therefore do not affect the optical appearance of the substrate. Due to the small coating thicknesses, only a very small amount of material is used, which is advantageous both in terms of cost and also ecologically, and the weight change of the substrate to be coated is nearly unnoticeable. The coating thickness of the silicon-based coating as provided herein following evaporation of the solvent and curing is in the range from about 0.1 µm to about 50 µm. In some embodiments the coating thickness is from about 0.5 µm to about 40 µm. In some embodiments, the coating thickness is from about 0.1 µm to about 25 µm. In some other embodiments, the coating thickness is from about 1 µm to about 3 µm.

"Curing" refers to the process of polymerization after the coating is applied. Curing may be controlled through temperature, air flow, ratio of the solvents, choice of resin and hardener compounds, and the ratio of said compounds. The curing process can take minutes to hours. Some formulations benefit from heating during the cure period, whereas typically the formulation cures over time at ambient temperature. In other situations, the curing can be at elevated temperatures to increase the glass transition (Tg) properties of the finished coating product by enhancing the degree of crosslinking. Coatings ambiently cured may be at room temperature ranging from 5-40° C. By heating slightly, the curing time can be shortened. Curing may be performed at temperatures not exceeding about 100° C. Higher temperature may be applied as needed. The curing atmosphere may include, but is not limited to, air and other non-reactive or reactive gaseous environments which contain moisture, inert gases like nitrogen and argon, and reactive gases such as ammonia, hydrogen, carbon monoxide, and the like. Rapid cure times are achieved using this method when the applied coatings are exposed to the moisture-containing atmosphere at room temperature.

Coating-related testing provides quality control and product description based on industrial standards. Typical coating tests may include, but not be limited to, testing thickness, coefficient of friction, hardness, scratch resistance, the amount of force needed to scratch the coating from substrate; 90 degree peel from topcoat test; 90 degree peel from adhesive test; cross-hatch adhesion test; UV endurance test; heat stability test; conical bend test, impact direct and indirect test. In particular, thickness test, measuring the thickness of substrates and top-coated materials, may be carried out using test panels on which uniform films are produced by a coating suitable for spraying; using micrometers for dried films; using magnetic gauges for nonmagnetic coatings; using Wet Film Thickness Gauge or Pfund Gauge for wet film thickness; or using microscopic observation of precision angular cuts in the coating film. Hardness test of organic materials may be carried out using indentation hardness measurements, Sward-type hardness rocker instruments, or pendulum damping testers.

In addition, the "kinetic coefficient of friction" (COF, µ), also known as a "frictional coefficient" or "friction coefficient," describes the ratio of the force of friction between two bodies and the force pressing them together. Coefficients of friction range from near zero to greater than one. Rougher surfaces tend to have higher effective values. The COF measured under ASTM D1894 is called Standard COF. More standard ASTM (American Society for Testing and Materials) test methods for coatings are available at http://werner-blank.com/polyur/testmethods/coating_test.htm. In one embodiment, the thickness of the silicon-based coating resulted from the compositions provided herein is between from about 0.1 µm to about 45 µm. In one embodiment, the hardness of the silicon-based coating resulted from the compositions provided herein ranges from about 4H to about 9H, using ASTM D3363. Further, in one embodiment, the COF of the silicon-based coating resulted from the compositions provided herein is between from about 0.03 to about 0.04.

Surfaces, substrates and substrate layers suitable for resins provided herein may comprise any desirable substantially solid material that varies widely. For example, the type of surfaces that can be treated with the compositions of this disclosure includes glass; fiberglass; carbon fiber composites; basalt fiber composites; siloxane and ceramic fibers; ceramics, such as, silicon nitride, silicon carbide, silica, alumina, zirconia, and the like; metals, such as, for example, iron, stainless steel, galvanized steel, zinc, aluminum, nickel, copper, magnesium and alloys thereof, silver and gold and the like; plastics, such as, polymethyl methacrylate, polyurethane, polycarbonate, polyesters including polyethylene terephthalate, polyimides, polyamides, epoxy resins, ABS polymer, polyethylene, polypropylene, polyoxymethylene; porous mineral materials, such as, concrete, clay bricks, marble, basalt, asphalt, loam, terracotta; organic materials, such as wood, leather, parchment, paper and textiles; and coated surfaces, such as, plastics emulsion paints, acrylic coatings, epoxy coatings, melamine resins, polyurethane resins and alkyd coatings. The surface or substrate contemplated herein may also comprise at least two layers of materials. One layer of material, for example, may include glass, metal, ceramic, plastics, wood or composite material. Other layers of material comprising the surface or substrate may include layers of polymers, monomers, organic compounds, inorganic compounds, organometallic compounds, continuous layers, porous and nanoporous layers.

Further, the surfaces and substrates may have different shapes, e.g., substrates having flat, planar surfaces, molded articles having curved surfaces, fibers, fabrics, and the like. It will be appreciated by those skilled in the art that the foregoing lists are merely illustrative of various materials which may be coated using the presently disclosed compositions and methods, and are not in any way limiting of the different substrates with which the present disclosure is useful. Insofar as they protect virtually any type of substrate from oxidative thermal degradation, corrosion, or chemical attack. The coatings may also be used to strengthen relatively flaw sensitive brittle substrates such as glass and non-wetting surfaces. The coatings may additionally be useful to provide bonding or compatibility interfaces between different types of materials.

A particularly advantageous, but non-limiting, use of this coating is for surfaces that undergo high pressure and temperature, and multiple pulls. A protective film provided by the silicon-based compositions disclosed herein over the base layer of paint or surface material of these surfaces is particularly useful to provide long lasting protection, in comparison to other materials in market, from various external forces, which can be destructive over a period of time. Other advantageous, but non-limiting, use of the coatings provided herein is to coat on automobile, aircraft, missiles, aerospace components, marine vessels, wheels, wind generation equipment and blades, engine shrouds, car exhausts, smoke stacks, industrial kilns, combustion chambers, industrial duct and pipe systems, solar panels, electronic components, fire and safety appliance, insulation and energy systems, building surfaces, public spaces, packaging surfaces, outdoor signs and advertisement billboard or LED screens, food- and beverage-processing equipment, cookware and containers. Those surfaces are exposed to UV, heat, coldness, moisture, ice build-up, chemical corrosion, and wear and tear from natural physical forces creating friction such as, water, air flow and dust. In addition, such protection is particularly suitable for mechanical components exposed to high temperatures, including, for example, exterior aircraft surfaces, a wing slat or pylon made of titanium, aluminum or cress metal; heat shields on an aircraft or other coated aircraft areas subject to engine efflux. A protective film provided by the silicon-based compositions disclosed herein over the base layer of paint or surface material of these surfaces is particularly useful to protect the surface and the substrate material from various external forces, particularly from the heat and high temperature, by greatly reducing radiant heat passing through the surface and the substrate material.

In exemplary embodiments, the coating may be formed on a medical device. In some embodiments, the medical device may be selected from the group consisting of catheter, surgical instrument, implant, heart valve, vascular graft, sensor, stent, annulus, insulator for electrical leads, extracorporeal blood-loop circuit, implantable cardiac assist device for prolonged circulatory support, left ventricular assist device (LVAD), polyethylene braid, artificial cord, tether, suture, peripherally inserted central catheter (PICC) line, fistula plug, membrane, blood bag; blood processing, transportation and storage equipment and materials; Luer connector, aneurysm patch, conduit, coil, roller pump, patent foramen ovale (PFO), reconstruction patch, transapical device, angioplasty tool, cannula, and annuloplasty ring. The surgical instrument may beselected from the group consisting of grasper, forceps, clamp, retractor, distractor, cutter, scalpel, lancet, drill bit, rasp, trocar, dilator, specula, suction tip, suction tube, sealing device, irrigation needle, injection needle, Tyndaller, drill, dermatome, scope, probe, endoscope, ultrasonic tissue disruptor, ruler, and caliper. In particular embodiments, the implant may be an orthopedic implant, for example, selected from the group consisting of Austin-Moore prosthesis, Baksi's prosthesis, buttress plate, charnley prosthesis, condylar blade plate, dynamic compression plate, Ender's nail, Gross-Kempf nail, Harrington rod, Hartshill rectangle, Insall Burstein prosthesis, interlocking nail, Kirschner wire, Kuntscher nail, Luque rod, Moore's pin, Neer's prosthesis, Rush nail, Smith Peterson nail, McLaughlin's plate, Seidel nail, Souter's prosthesis, Steffee plate, Steinmann pin, Swanson prosthesis, Talwalkar nail, Thompson prosthesis, unicompartmental knee.

The cured coating is formed from any of the silicon-based composition described herein, and may be cured by any disclosed method, particularly by exposing the substrate coated with a resin to ambient conditions at room temperature for about 24 hours, or less. Within the cured coating, silicon-based substituents are substantially completely reacted to form new covalent bonds to each other and to the substrate. Furthermore, if the resin contained substituents bearing vinyl groups, the C=C bonds are also consumed in the formation of new covalent bonds. Overall, the coating comprises a crosslinked polymer network comprising Si—O, Si—N, and Si—C bonds, especially when both the Si—N and the Si—O bonds are part of the same polymer network within the coating. The coating may also substantially free of ammonia, free amines, or ammonium chloride. The cross-linked polymer provides a durable and hard coating, as described throughout this specification.

In particular, the cured coating may comprise a compound of formula (II),

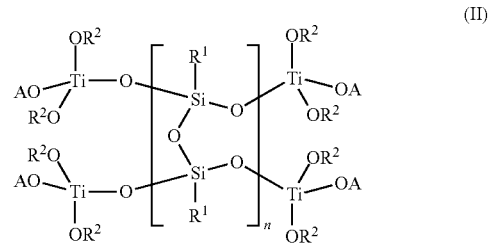

wherein:
each $R^1$ is hydrocarbyl;
each $R^2$ is alkyl;
each A is selected from the group consisting of

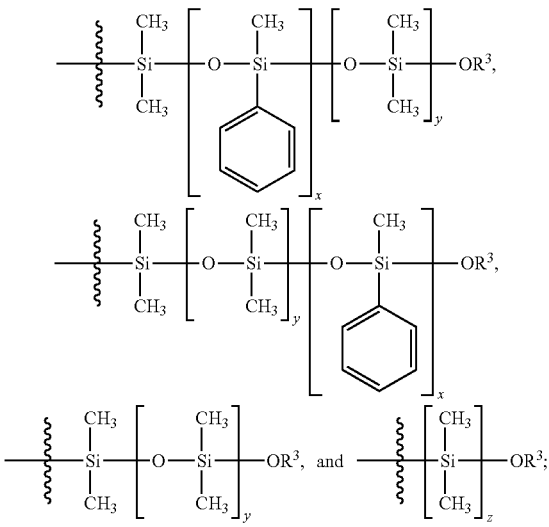

each $R^3$ is selected from the group consisting of alkyl and $SiH(OR^4)_2$;
each $R^4$ is selected from the group consisting of methyl and ethyl;
n is between 4 and 100; and
x, y, and z are each between 1 and 100.

In some embodiments, each $R^1$ may be alkyl. In other embodiments, each $R^1$ may be $C_1$-$C_{20}$ alkyl. In some other embodiments, each $R^1$ may be $C_1$-$C_{10}$ alkyl. In still other embodiments, each $R^1$ may be $C_1$-$C_8$ alkyl. In yet other embodiments, each $R^1$ may be selected from the group consisting of methyl, ethyl, propyl, and butyl. In exemplary embodiments, each $R^1$ may be methyl.

In some embodiments, each $R^2$ may be $C_1$-$C_{20}$ alkyl. In some other embodiments, each $R^2$ may be $C_1$-$C_{10}$ alkyl. In still other embodiments, each $R^2$ may be $C_1$-$C_8$ alkyl. In yet other embodiments, each $R^2$ may be selected from the group consisting of methyl, ethyl, propyl, and butyl. In exemplary embodiments, each $R^2$ may be butyl.

In some embodiments, each $R^3$ may be $C_1$-$C_{20}$ alkyl. In some other embodiments, each $R^3$ may be $C_1$-$C_{10}$ alkyl. In still other embodiments, each $R^3$ may be $C_1$-$C_8$ alkyl. In yet other embodiments, each $R^3$ may be selected from the group consisting of methyl, ethyl, propyl, and butyl.

The number x may range from 0 to 100, such as 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100. In one embodiment, x may range from 5 to 25. In some embodiments, x is less than 100. In some other embodiments, x is less than 25. In yet other embodiments, x is greater than 1. In still other embodiments, x is greater than 5.

The number y may range from 1 to 100, such as 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100. In one embodiment, y may range from 5 to 25. In some embodiments, y is less than 100. In some other embodiments, y is less than 25. In yet other embodiments, y is greater than 1. In still other embodiments, y is greater than 5.

The number z may range from 1 to 100, such as 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100. In one embodiment, z may range from 5 to 25. In some embodiments, z is less than 100. In some other embodiments, z is less than 25. In yet other embodiments, z is greater than 1. In still other embodiments, z is greater than 5.

In exemplary embodiments, the numbers x, y, and z may each be between 5 and 25.

The number n may range from 1 to 100, such as 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100. In some embodiments, n is less than 100. In some other embodiments, n is greater than 1. In exemplary embodiments, n is 4.

In a particular embodiment of this aspect, the compound of formula (II) may comprise a compound of formula (III):

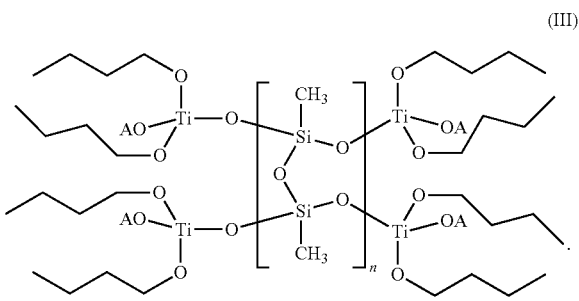

(III)

A and n may be as defined above for formula (II) or any embodiments thereof.

Although the disclosure described herein is susceptible to various modifications and alternative iterations, specific embodiments thereof have been described in greater detail above. It should be understood, however, that the detailed description of the composition is not intended to limit the disclosure to the specific embodiments disclosed. Rather, it should be understood that the disclosure is intended to cover all modifications, equivalents, and alternatives falling within the spirit and scope of the disclosure as defined by the claim language.

DEFINITIONS

As used herein, the terms "about" and "approximately" designate that a value is within a statistically meaningful range. Such a range can be typically within 20%, more typically still within 10%, and even more typically within 5% of a given value or range. The allowable variation encompassed by the terms "about" and "approximately" depends on the particular system under study and can be readily appreciated by one of ordinary skill in the art.

As used herein, the term "w/w" designates the phrase "by weight," "weight percent," or "wt. %," and is used to describe the concentration of a particular substance in a mixture or solution.

As used herein, the term "ml/kg" designates milliliters of composition per kilogram of formula weight.

As used herein, the term "cure" or "curing" refers to a change in state, condition, and/or structure in a material that is usually, but not necessarily, induced by at least one variable, such as time, temperature, moisture, radiation, presence and quantity in such material of a enhancer, accelerator, or the like. The terms cover partial as well as complete curing.

As used herein, the term "hardness" or "H" designates the property of a material that enables it to resist plastic deformation, usually by penetration. However, the term hardness may also refer to resistance to bending, scratching, abrasion or cutting. The usual method to achieve a hardness value is to measure the depth or area of an indentation left by an indenter of a specific shape, with a specific force applied for a specific time. There are four principal standard test methods for expressing the relationship between hardness and the size of the impression, these being Pencil Hardness ASTM D3363, Brinell, Vickers, and Rockwell. For practical and calibration reasons, each of these methods is divided into a range of scales, defined by a combination of applied load and indenter geometry.

As used herein, the term "coefficient of friction" (COF), also known as a "frictional coefficient" or "friction coefficient" or "kinetic coefficient of friction" and is an empirical measurement which describes the ratio of the force of friction between two bodies and the force pressing them together. The coefficient of friction depends on the materials used. When the coefficient of friction is measured by a standardized surface, the measurement is called "standardized coefficient of friction."

As used herein, the term "corrosion resistant agent" or variation thereof refers to additives in the coating on a surface which inhibit the corrosion of the surface substrate when it is exposed to air, heat, or corrosive environments for prolonged time periods.

By "oligomer" is meant any molecule or chemical compound which comprises several repeat units, generally from about 2 to 10 repeat units. "Polymer" or "copolymer", as used herein, means a molecule or compound which comprises a large number of repeat units, generally greater than about 10 repeat units.

As used herein, the term "monomer" refers to any chemical compound that is capable of forming a covalent bond with itself or a chemically different compound in a repetitive manner. The repetitive bond formation between monomers may lead to a linear, branched, super-branched, or three-dimensional product. Furthermore, monomers may themselves comprise repetitive building blocks, and when polymerized the polymers formed from such monomers are then termed "blockpolymers." Monomers may belong to various chemical classes of molecules including organic, organometallic or inorganic molecules. The molecular weight of monomers may vary greatly between about 40 Daltons and 20,000 Daltons. However, especially when monomers comprise repetitive building blocks, monomers may have even higher molecular weights. Monomers may also include additional reactive groups.

Contemplated polymers may also comprise a wide range of functional or structural moieties, including aromatic systems, and halogenated groups. Furthermore, appropriate polymers may have many configurations, including a homopolymer, and a heteropolymer. Moreover, alternative polymers may have various forms, such as linear, branched, super-branched, or three-dimensional. The molecular weight of contemplated polymers spans a wide range, typically between 400 Daltons and 400,000 Daltons or more.

"Prepolymer" refers to polymeric structures formed by the processes in the present disclosure are long term-stable liquids, and possess only moderate odors, which mostly arise from the use of organic solvents. In the solid form, these polymerized materials may be handled similarly to thermosetting or thermoplastic processes. Molecular weight may vary from about 2,000 g/mol up to as much as 100,000 g/mol, depending on process. The density of the prepolymers is normally around 1 g/cm$^3$.

The polymerization processes include, but are not limited to, step-growth polymerization, polyaddition, and polycondensation. More specifically, polymerization can be initiated by mechanisms, such as acid- or base-catalysis, or free radical polymerization. It may comprise ring-opening copolymerization, and the formation of inorganic and/or organic polymer networks. The actual mechanisms of polymerization depend on the functional groups of the reacting polymeric and monomeric compounds, as well as inherent steric effects. Adding non-conventional starting materials into the polymerization process, such as ammonia, can form conceptually new materials.

The compounds described herein have asymmetric centers. Compounds of the present disclosure containing an asymmetrically substituted atom may be isolated in optically active or racemic form. All chiral, diastereomeric, racemic forms and all geometric isomeric forms of a structure are intended, unless the specific stereochemistry or isomeric form is specifically indicated.

The term "acyl," as used herein alone or as part of another group, denotes the moiety formed by removal of the hydroxy group from the group COOH of an organic carboxylic acid, e.g., RC(O)—, wherein R is $R^1$, $R^1O$—, $R^1R^2N$—, or $R^1S$—, $R^1$ is hydrocarbyl, heterosubstituted hydrocarbyl, or heterocyclo, and $R^2$ is hydrogen, hydrocarbyl, or substituted hydrocarbyl.

The term "acyloxy," as used herein alone or as part of another group, denotes an acyl group as described above bonded through an oxygen linkage (O), e.g., RC(O)O— wherein R is as defined in connection with the term "acyl."

The term "allyl," as used herein not only refers to compound containing the simple allyl group ($CH_2$=CH—$CH_2$—), but also to compounds that contain substituted allyl groups or allyl groups forming part of a ring system.

The term "alkyl" as used herein describes groups which are preferably lower alkyl containing from one to eight carbon atoms in the principal chain and up to 20 carbon atoms. They may be straight or branched chain or cyclic and include methyl, ethyl, propyl, isopropyl, butyl, hexyl and the like.

The term "alkenyl" as used herein describes groups which are preferably lower alkenyl containing from two to eight carbon atoms in the principal chain and up to 20 carbon atoms. They may be straight or branched chain or cyclic and include ethenyl, propenyl, isopropenyl, butenyl, isobutenyl, hexenyl, and the like.

The term "alkynyl" as used herein describes groups which are preferably lower alkynyl containing from two to eight carbon atoms in the principal chain and up to 20 carbon atoms. They may be straight or branched chain and include ethynyl, propynyl, butynyl, isobutynyl, hexynyl, and the like.

The term "aromatic" as used herein alone or as part of another group denotes optionally substituted homo- or heterocyclic conjugated planar ring or ring system comprising delocalized electrons. These aromatic groups are preferably monocyclic (e.g., furan or benzene), bicyclic, or tricyclic groups containing from 5 to 14 atoms in the ring portion. The term "aromatic" encompasses "aryl" groups defined below.

The terms "aryl" or "Ar" as used herein alone or as part of another group denote optionally substituted homocyclic aromatic groups, preferably monocyclic or bicyclic groups containing from 6 to 10 carbons in the ring portion, such as phenyl, biphenyl, naphthyl, substituted phenyl, substituted biphenyl, or substituted naphthyl.

The terms "carbocyclo" or "carbocyclic" as used herein alone or as part of another group denote optionally substituted, aromatic or non-aromatic, homocyclic ring or ring system in which all of the atoms in the ring are carbon, with preferably 5 or 6 carbon atoms in each ring. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The terms "halogen" or "halo" as used herein alone or as part of another group refer to chlorine, bromine, fluorine, and iodine.

The term "heteroatom" refers to atoms other than carbon and hydrogen.

The term "heteroaromatic" as used herein alone or as part of another group denotes optionally substituted aromatic groups having at least one heteroatom in at least one ring, and preferably 5 or 6 atoms in each ring. The heteroaromatic group preferably has 1 or 2 oxygen atoms and/or 1 to 4 nitrogen atoms in the ring, and is bonded to the remainder of the molecule through a carbon. Exemplary groups include furyl, benzofuryl, oxazolyl, isoxazolyl, oxadiazolyl, benzoxazolyl, benzoxadiazolyl, pyrrolyl, pyrazolyl, imidazolyl, triazolyl, tetrazolyl, pyridyl, pyrimidyl, pyrazinyl, pyridazinyl, indolyl, isoindolyl, indolizinyl, benzimidazolyl, indazolyl, benzotriazolyl, tetrazolopyridazinyl, carbazolyl, purinyl, quinolinyl, isoquinolinyl, imidazopyridyl, and the like. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The terms "heterocyclo" or "heterocyclic" as used herein alone or as part of another group denote optionally substituted, fully saturated or unsaturated, monocyclic or bicyclic, aromatic or non-aromatic groups having at least one heteroatom in at least one ring, and preferably 5 or 6 atoms in each ring. The heterocyclo group preferably has 1 or 2 oxygen atoms and/or 1 to 4 nitrogen atoms in the ring, and is bonded to the remainder of the molecule through a carbon or heteroatom. Exemplary heterocyclo groups include heteroaromatics as described above. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The terms "hydrocarbon" and "hydrocarbyl" as used herein describe organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 20 carbon atoms.

The term "protecting group" as used herein denotes a group capable of protecting a particular moiety, wherein the protecting group may be removed, subsequent to the reaction for which the protection is employed, without disturbing the remainder of the molecule. Where the moiety is an oxygen atom (and hence, forming a protected hydroxy), exemplary protecting groups include ethers (e.g., allyl, triphenylmethyl (trityl or Tr), p-methoxybenzyl (PMB), p-methoxyphenyl (PMP)), acetals (e.g., methoxymethyl (MOM), β-methoxyethoxymethyl (MEM), tetrahydropyranyl (THP), ethoxy ethyl (EE), methylthiomethyl (MTM), 2-methoxy-2-propyl (MOP), 2-trimethylsilylethoxymethyl (SEM)), esters (e.g., benzoate (Bz), allyl carbonate, 2,2,2-trichloroethyl carbonate (Troc), 2-trimethylsilylethyl carbonate), silyl ethers (e.g., trimethylsilyl (TMS), triethylsilyl (TES), triisopropylsilyl (TIPS), triphenylsilyl (TPS), t-butyldimethylsilyl (TBDMS), t-butyldiphenylsilyl (TBDPS) and the like. When the moiety is an nitrogen atom (and hence, forming a protecting amine) exemplary protecting groups include benzyl, p-methoxyphenyl (PMP), 3,4-dimethoxybenxyl (PMB)), n-silyl groups, esters (e.g., benzoate (Bz), carbonyl (e.g. p-methoxybenzyl carbonyl (Moz), tert-butyloxycarbonyl (BOC), 9-fluorenylmethyloxycarbonyl (FMOC)), acetyl, carbamates, n-silyl groups and the like. A variety of protecting groups and the synthesis thereof may be found in "Protective Groups in Organic Synthesis" by T. W. Greene and P. G. M. Wuts, John Wiley & Sons, 1999.

The "substituted hydrocarbyl" moieties described herein are hydrocarbyl moieties which are substituted with at least one atom other than carbon, including moieties in which a carbon chain atom is substituted with a heteroatom such as nitrogen, oxygen, silicon, phosphorous, boron, or a halogen atom, and moieties in which the carbon chain comprises additional substituents. These substituents include alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

When introducing elements of the present disclosure or the exemplary embodiments(s) thereof, the articles "a," "an," "the," and "said" are intended to mean that there are one or more of the elements. The terms "comprising," "including," and "having" are intended to be inclusive and mean that there may be additional elements other than the listed elements.

Unless otherwise defined, all technical and scientific terms used herein have the same meaning as is commonly understood by one of skill in the art to which this disclosure belongs at the time of filing. If specifically defined, then the definition provided herein takes precedent over any dictionary or extrinsic definition. Further, unless otherwise required by context, singular terms shall include pluralities, and plural terms shall include the singular. Herein, the use of "or" means "and/or" unless stated otherwise. All patents and publications referred to herein are incorporated by reference.

The following examples are intended to further illustrate and explain the present disclosure. The disclosure, therefore, should not be limited to any of the details in these examples.

EXAMPLES

The following examples are included to demonstrate certain embodiments of the disclosure. It should be appreciated by those of skill in the art that the techniques disclosed in the examples represent techniques discovered by the inventors to function well in the practice of the disclosure. Those of skill in the art should, however, in light of the present disclosure, appreciate that many changes can be made in the specific embodiments that are disclosed and still obtain a like or similar result without departing from the spirit and scope of the disclosure, therefore all matter set forth is to be interpreted as illustrative and not in a limiting sense.

Example 1

Silicon-Based Compositions Using Methoxymethylsiloxane and Butyltitanate

It was investigated as to how adding an amine-containing constituent would effect the curing of a methoxymethylsiloxane resin with an alkyltitanate. To 2 g of methoxymethylsiloxane (Silres® siloxane) was added 50 mg butyltitanate (Tyzor™ BTP) and the components were mixed at 25° C. The reaction mixture was sonicated using a Fisher FS 15 sonicator bath for 1 minute to promote rapid mixing. The reaction mixtures was allowed to react at 25° C. for 30 minutes before recording the Fourier transform infrared (FTIR) spectrum. The spectrum of the neat mixture (with no solvents added) was recorded the using an atenuated total reflectance (ATR) detection mode. All FTIR spectra were recorded using a Cary 630 FTIR (ATR) spectrophotometer with an average of 64 scans at 25° C. under air.

Figure 3:
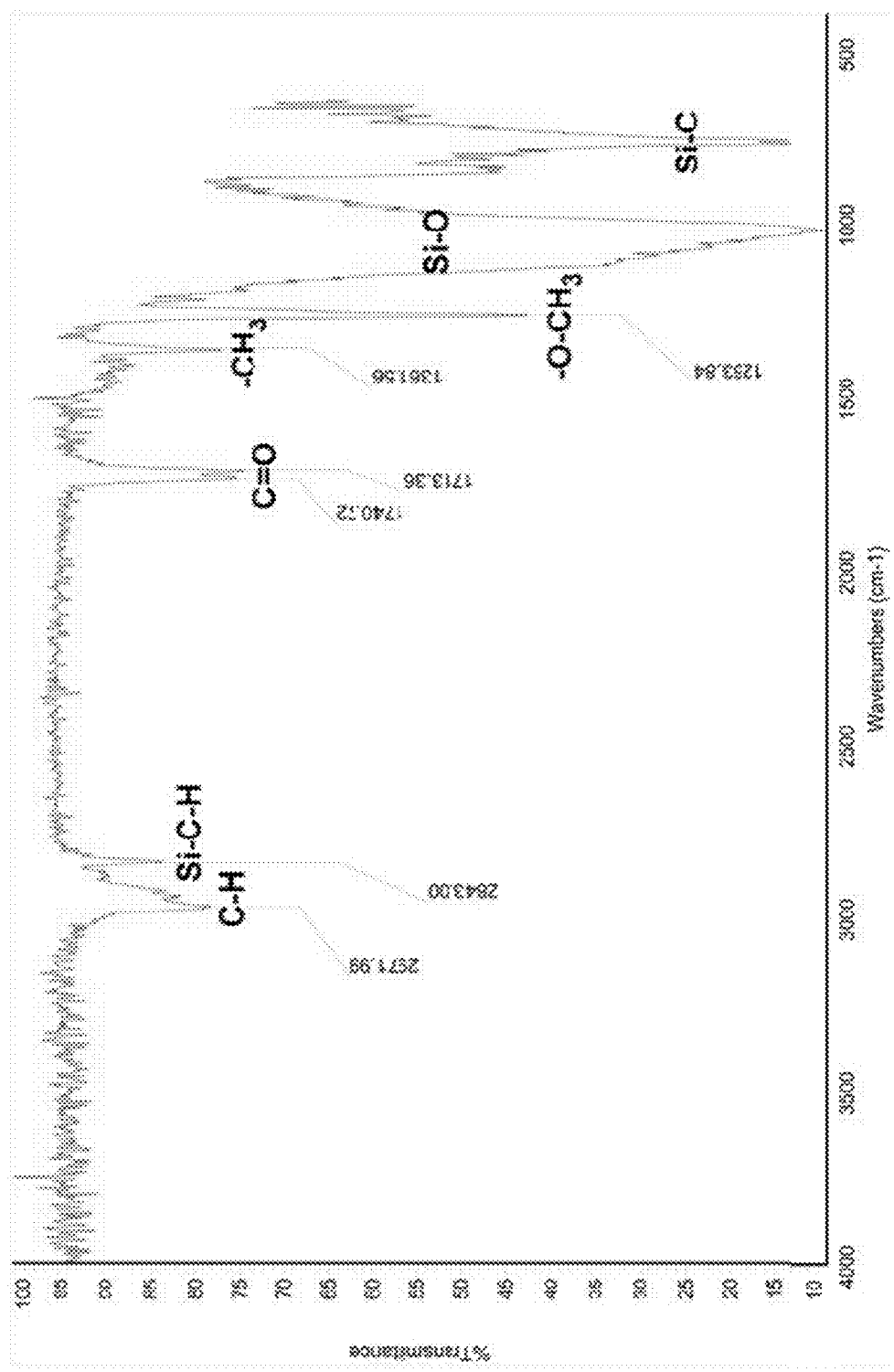
FIG. 3 depicts the FTIR spectrum for the polymerization of a Silres® siloxane enhanced by Tyzor™ BTP from Dorf Kettle Specialty Catalysts, LLC.
Figure 4:
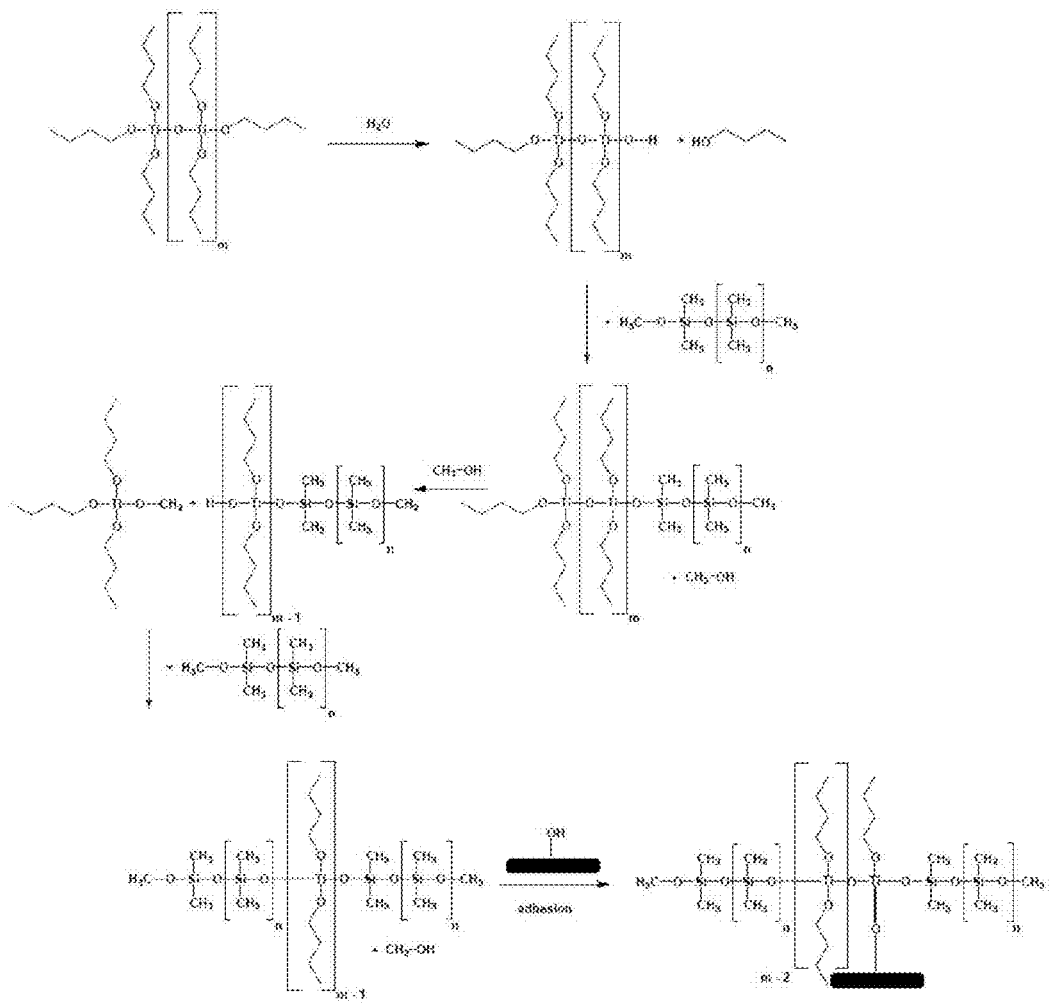
FIG. 4 depicts a reaction mechanism of the polymerization of a Silres® siloxane enhanced by Tyzor™ BTP.
Figure 5:
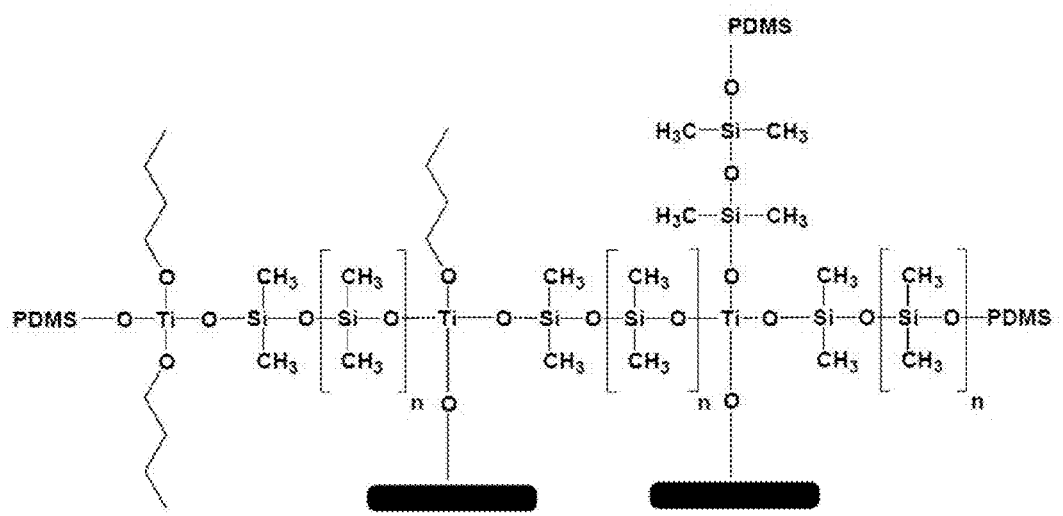
FIG. 5 depicts a compound resulting from the reaction of Tyzor™ BTP with a Silres® siloxane.

The reacted mixture was compared with the known Silres® siloxane and Tyzor™ BTP starting materials. FIG. 3 depicts the FTIR spectrum and FIG. 4 the reaction mechanism for the polymerization of a Silres® siloxane enhanced by Tyzor™ BTP. Based on the proposed reaction mechanism and experimental observations, the reaction used ambient water for curing, which may have come from the atmosphere or the Silres® siloxane itself. A moisture level varied from batch to batch and decreased with the age of the Silres® siloxane was observed. From the FTIR spectra, the moisture content in Silres® was estimated to have increased from about 0.1% to about 0.5% after 2 weeks of storage at 4° C. FIG. 5 depicts a compound resulting from the reaction of Tyzor™ BTP with a Silres® siloxane, as shown in FIG. 4.

Figure 6:
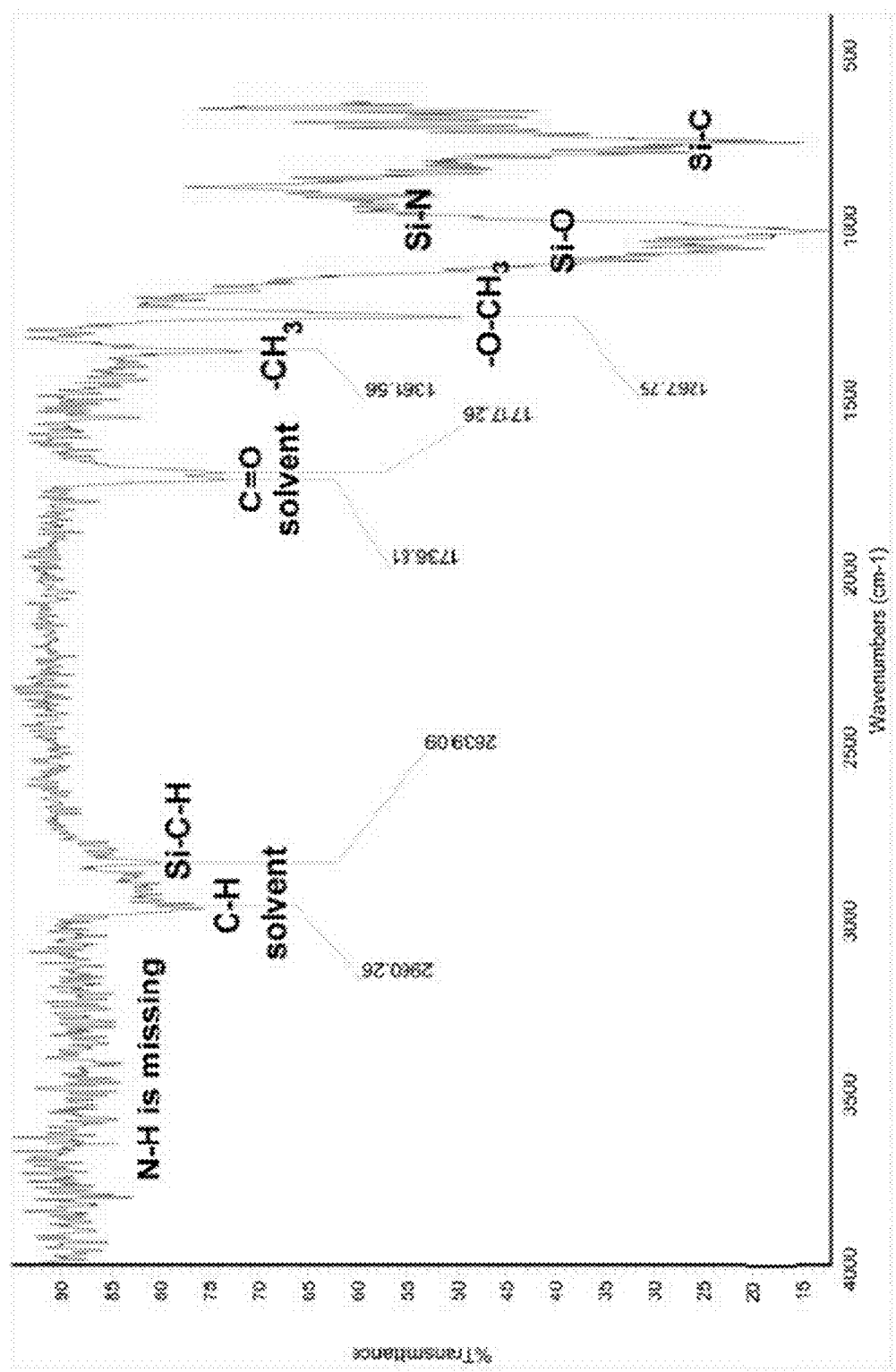
FIG. 6 depicts the FTIR spectrum for N-[3-(trimethoxysilyl)propyl]ethylenediamine after reaction with a compound resulting from the reaction of Tyzor™ BTP with a Silres® (depicted in FIG. 5).
Figure 7:
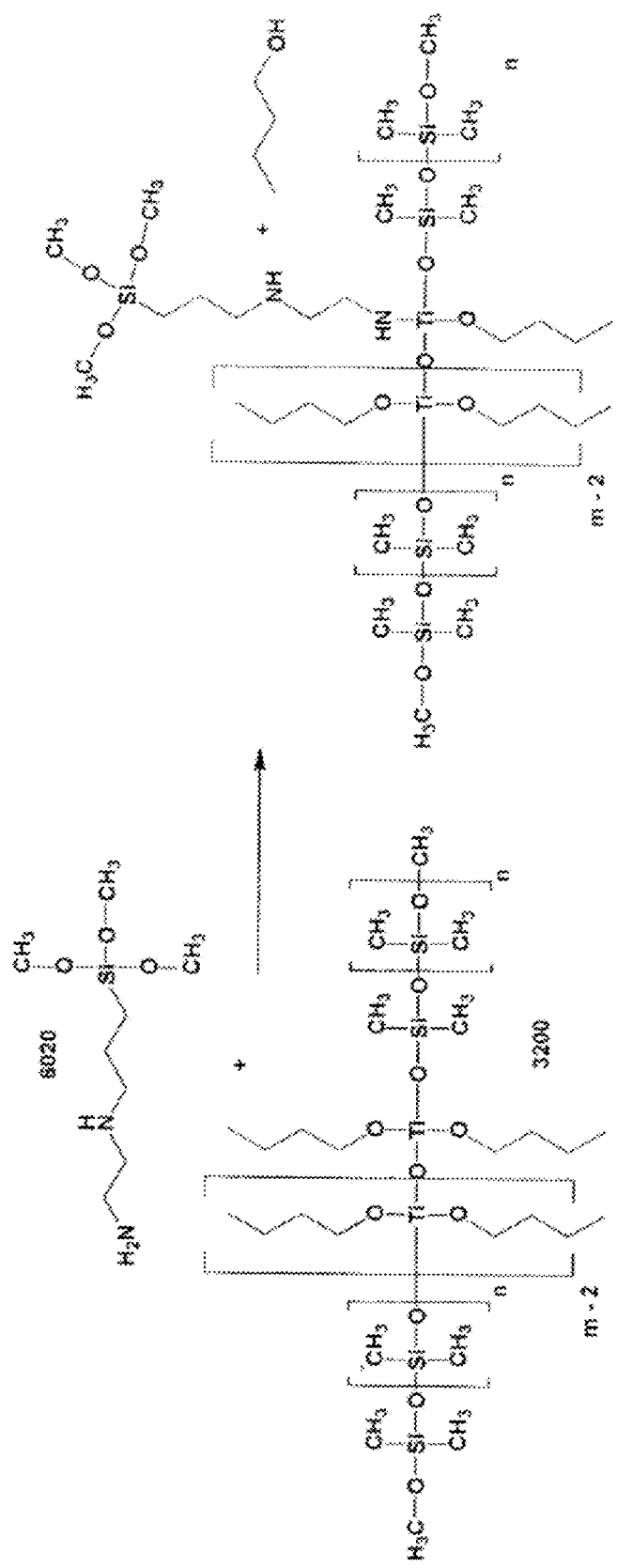
FIGS. 7-9 depicts reactions between the compound resulting from the reaction of Tyzor™ BTP with a Silres® siloxane (as depicted in FIG. 4) and N-[3-(trimethoxysilyl)propyl]ethylenediamine.
Figure 8:
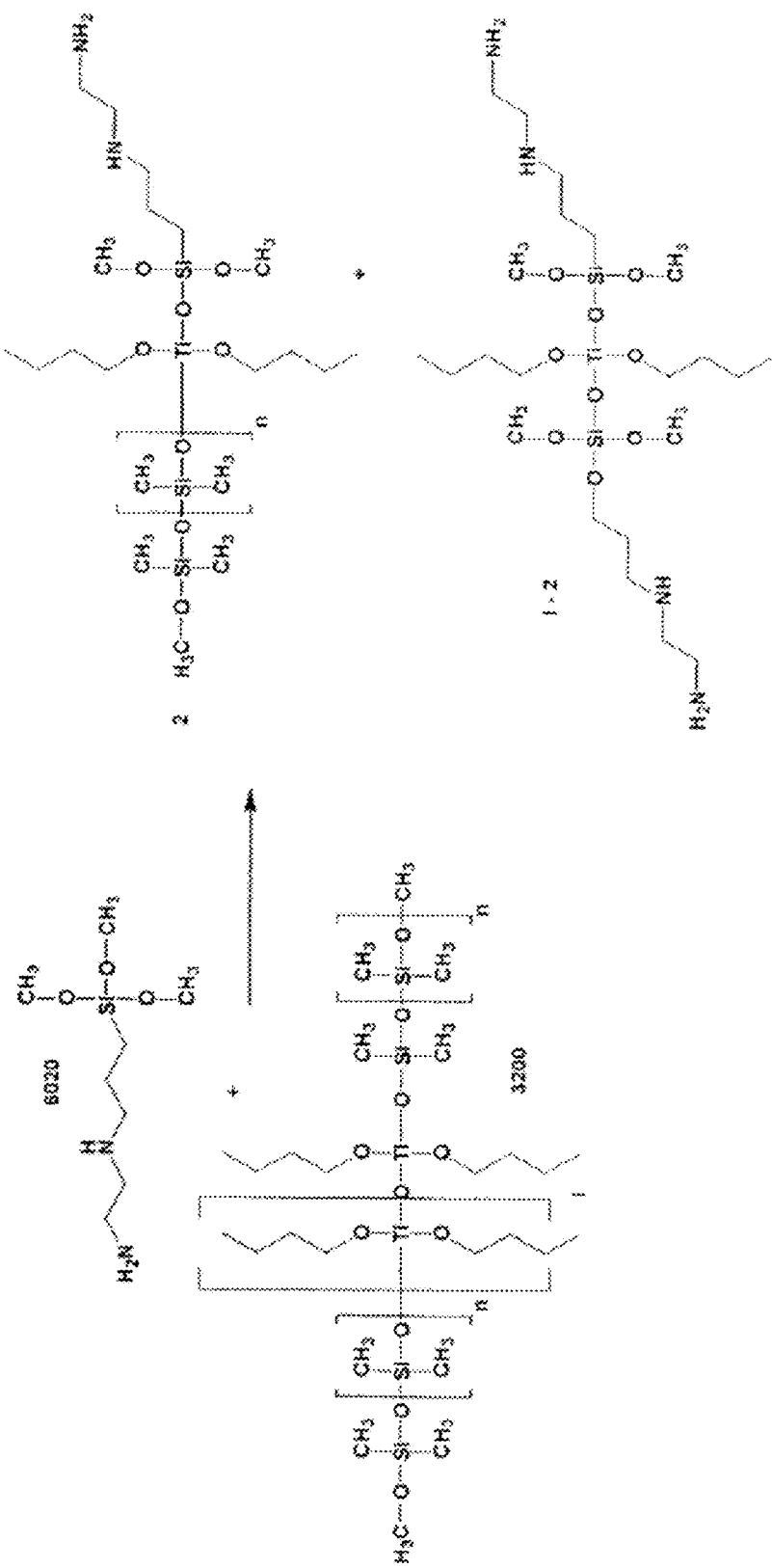

To 1 g of the reaction mixture of Silres® siloxane and Tyzor™ BTP described above was added 0.50 g of N-[3-(trimethoxysilyl)propyl]ethylenediamine. The new reaction mixture was sonicated using a Fisher FS15 sonicator bath for 1 minute to promote rapid mixing. The reaction mixture was allowed to react at 25° C. for 30 minutes before recording the ATR-FTIR spectrum (64 scans) on the neat mixture without added solvents (FIG. 6). The lack of N—H stretches in the spectrum indicated that the aliphatic amines, including both the primary and secondary amines, reacted with the n-butylate groups of the titanate bridges. This reaction further induced branching reactions, as shown in FIGS. 6-8, by reacting with both, the titanium centers and the silicon centers in the linear silicone segments. The result was increased crosslinking of the materials.

Figure 9:
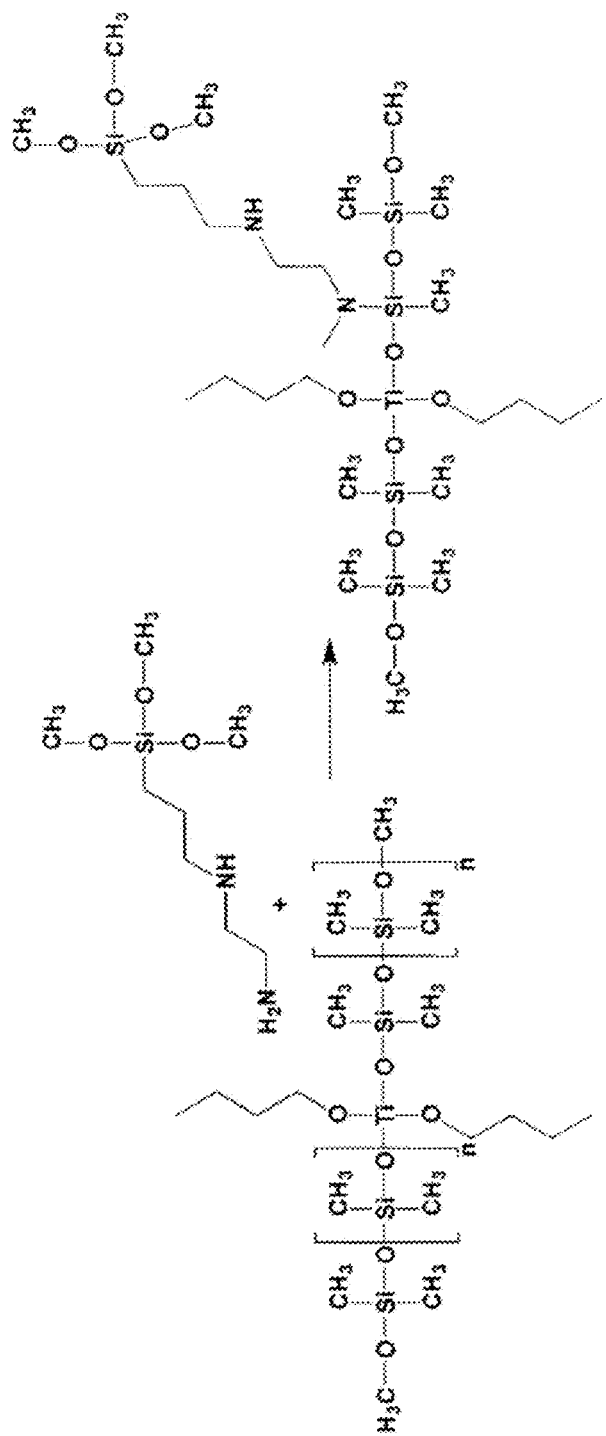

In view of the data described above, the Si—O—CH$_3$ groups reacted with the Ti—O—Ti centers that remained, rendering the material more reactive. The FTIR spectrum indicated newly formed Si—N bonds; therefore, the reaction depicted in FIG. 9 resulted in stable coatings. This reaction enhanced the reactivity of the mixture during the curing process. The reactions of FIGS. 6-8 formed a more closely interwoven network. In addition, the reaction was pH-dependent and as catalyzed by the presence of bases, such as N-[3-(trimethoxysilyl)propyl]ethylenediamine. Therefore, increasing the concentration of N-[3-(trimethoxysilyl)propylethylenediamine accelerated the hardening reaction, especially at room temperature. Similar results were previously obtained using DT-6020 instead of N-[3-(trimethoxysilyl) propyl]ethylenediamine. With both amines, room temperature curing was fastest when 33% by weight of either N-[3-(trimethoxysilyl)propyl]ethylenediamine or DT-6020 were added. At higher ratios, the coatings become brittle. The mixtures hardened within 32 minutes for N-[3-(trimethoxysilyl)propyl]ethylenediamine and within 35 minutes for DT-6020 at 25° C. under air. In conclusion, and not wishing to be bound by theory, the amine-containing component should comprise less than 33% (w/w) of the total composition to prevent the formation of brittle coatings.

Example 2

Reaction of Silsesquioxane with Butyltitanate

Figure 10:
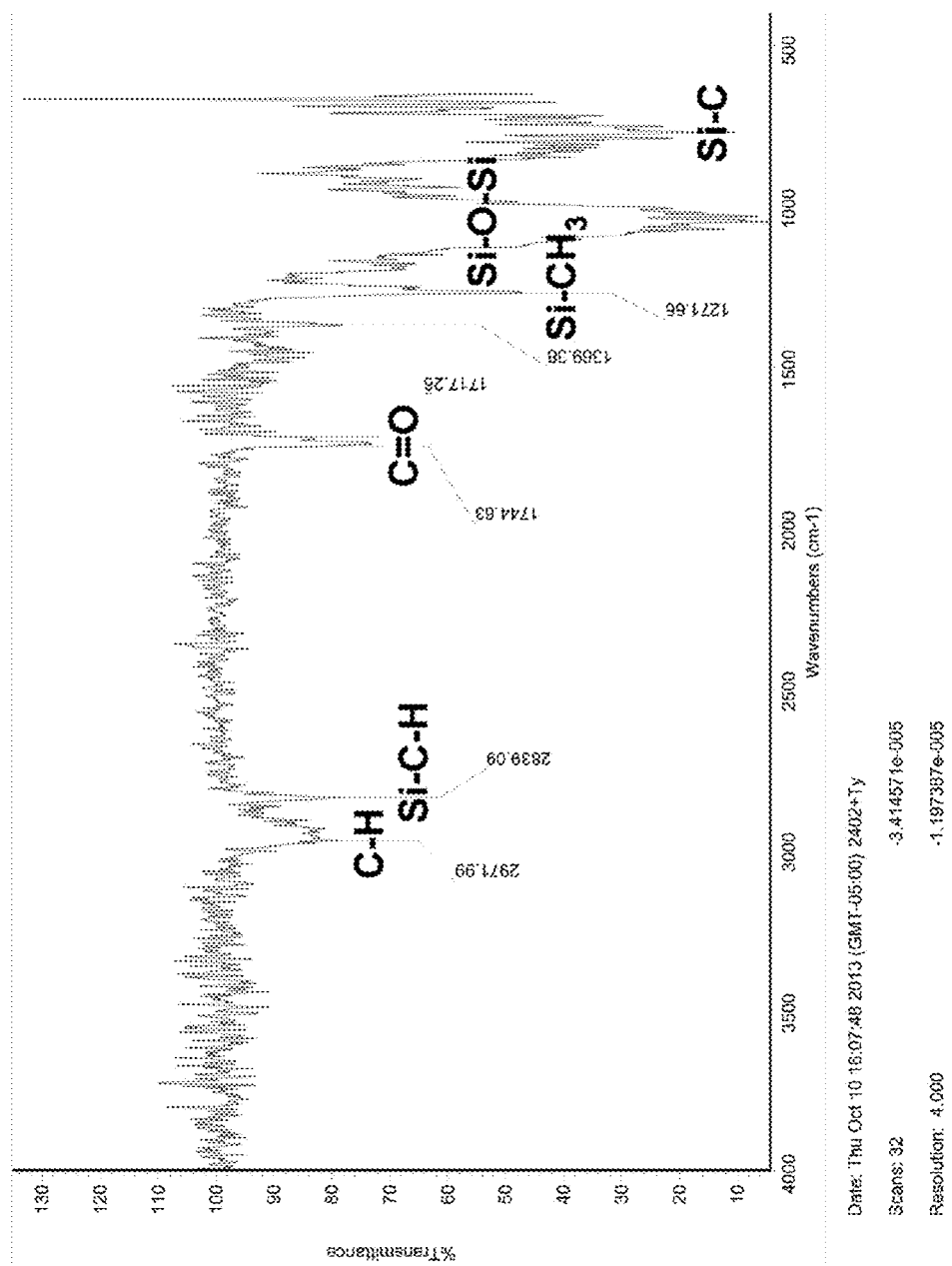
FIG. 10 depicts an FTIR spectrum of methylsilsesquioxane after reaction with polymeric butyltitanate.

Next the polymerized product of a silsesquioxane was compared to the products of methoxymethylsiloxane described above at Example 1. Methylsilsesquioxane (1 gram) was reacted with polymeric butyltitanate (100 mg). The reaction mixtures was sonicated using a Fisher FS15 sonicator bath for 1 minute to promote rapid mixing. The reaction mixture was allowed to react at 25° C. for 30 minutes before recording the ATR-FTIR spectrum (64 scans) the neat mixture without added solvent. The characteristic FTIR frequency for methylsilsesquioxane (Si—O—Si, 1180 cm$^{-1}$) was completely missing from the FTIR spectrum taken 15 minutes after mixing the constituents together at room temperature (FIG. 10). Curing proceeded for up to about 60 minutes.

Figure 11:
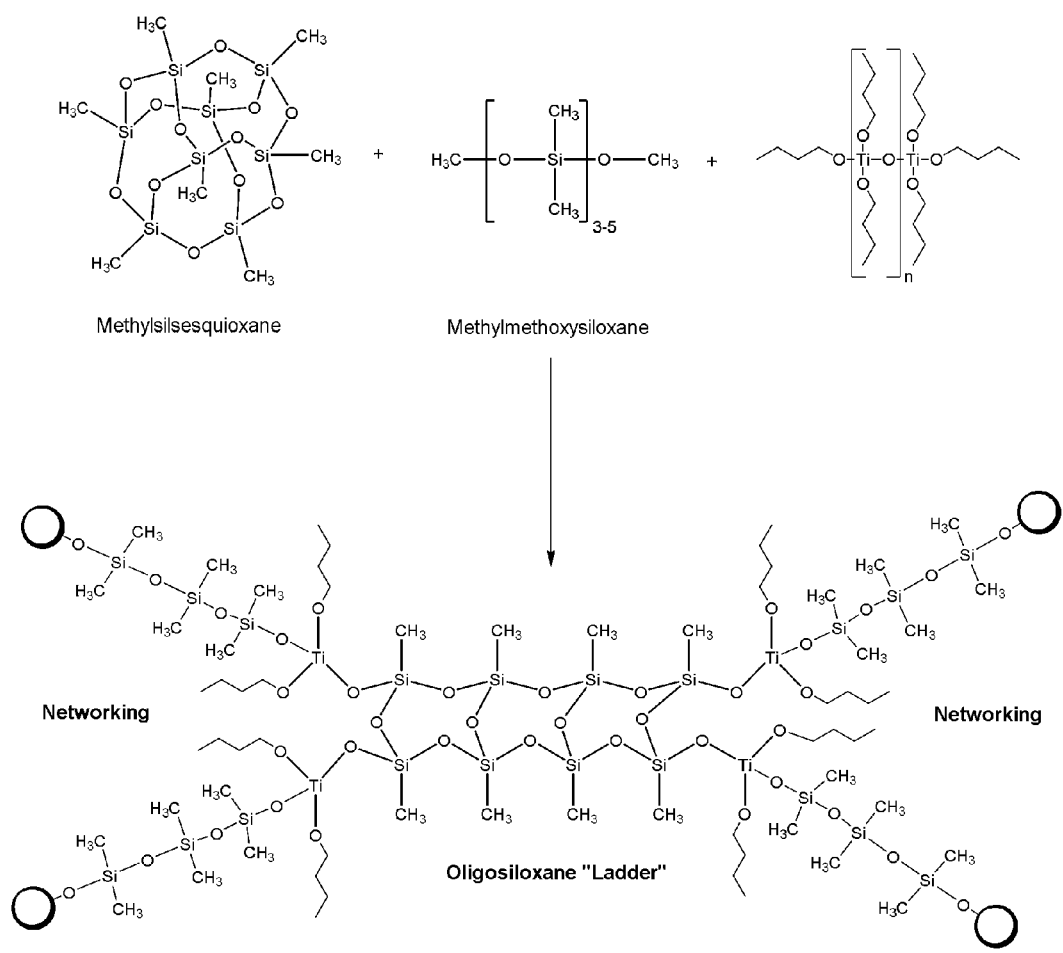
FIG. 11 depicts a reaction sequence for the reaction of methylsilsesquioxane after reaction with polymeric butyltitantate. Spheres indicate other portions of the molecule not explicitly drawn.

The caged structure of the methylsilsesquioxanes opened to form Si—O ladder polymers upon reaction with the butyltitanate, as depicted in FIG. 11. This reaction mechanism explained the observed formation of extremely thin layers of the polymerized material. Furthermore, the n-butanol solvent from the butyltitanate was oxidized to butanal, as indicated by the presence of a carbonyl group at 1744 cm$^{-1}$ in the spectrum. As a result, some Ti(IV) was reduced to red-colored Ti(III). The titanate reduction, however, reversibly oxidized in the air and did not interfere with forming a clear coating layer.

In conclusion, reaction of methylsilsesquioxane with butyltitanate led to previously unobserved siloxane latter structures. Because of subsequent chemistry on the titanium in the mixture, clear coatings were formed without tinting from the residual titanium compounds.

Example 3

Attempted Reaction of Silsesquioxane with Butyltitanate in the Presence of Amines Combining the results of Example 1 with Example 2 was attempted by testing the addition of an amine-containing constituent into a mixture of methylsilsesquioxane and butyltitanate. Specifically, the following reactions were attempted: mixtures of methylsilsesquioxane (1 g) with polymeric butyltitanate (100 mg) and N-[3-(trimethoxysilyl)propyl]ethylenediamine (250 mg), methylsilsesquioxane (1 g) with polymeric butyltitanate (100 mg) and polethyleneimide (250 mg), and methylsilsesquioxane (1 g) with polymeric butyltitanate (100 mg) and 1,3-diaminopropane (250 mg). All mixtures were very brittle after 1 minute of sonication at 25° C. These mixtures did not adhere to glass surfaces, as simple scratch tests with a spatula have indicated. Without polymeric butyltitanate, no hardening was observed within 24 hours after mixing.

Figure 12:
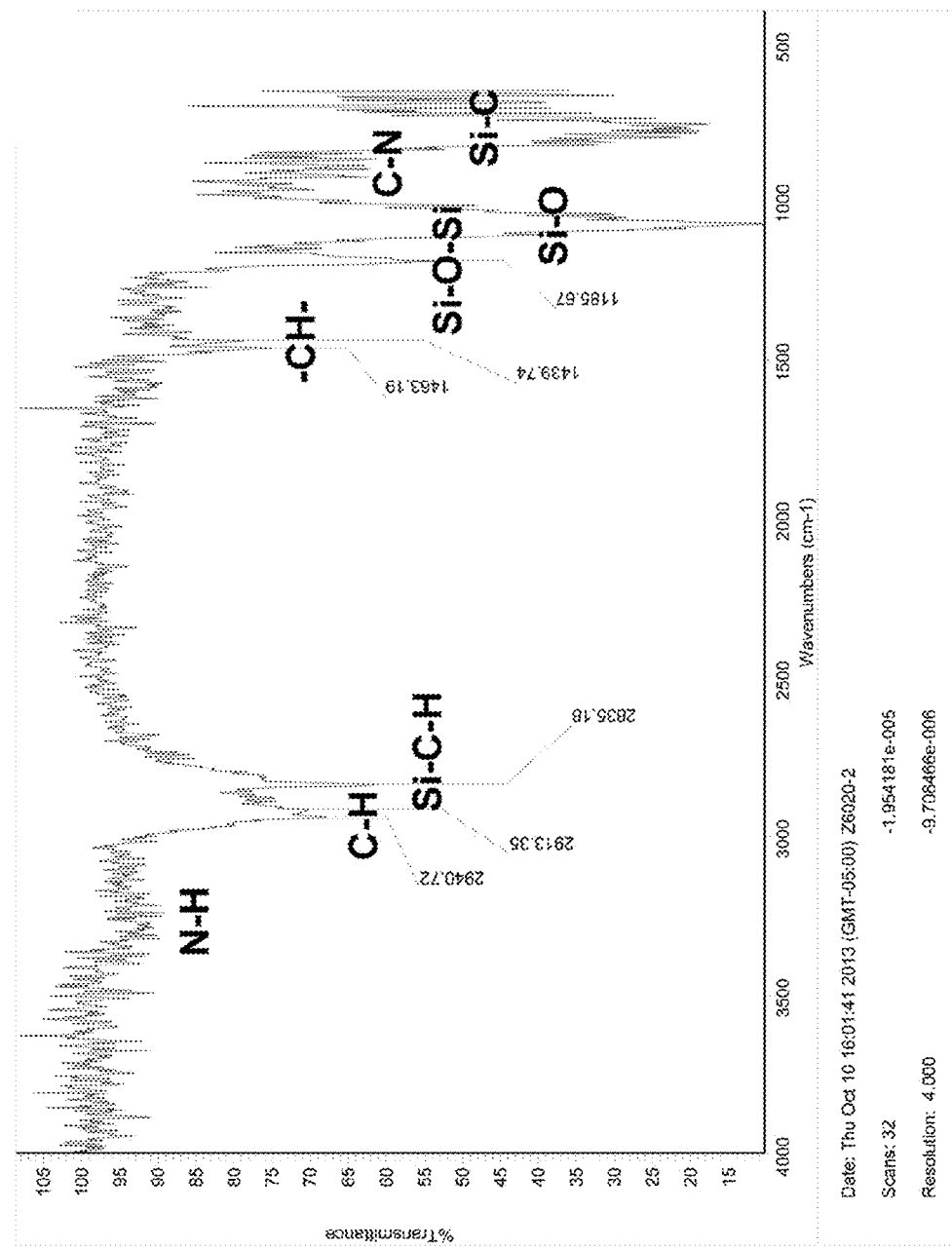
FIG. 12 depicts the FTIR spectrum of a mixture comprising methylsilsesquioxane, DT-6020, and polymeric butyltitanate.
Figure 13:
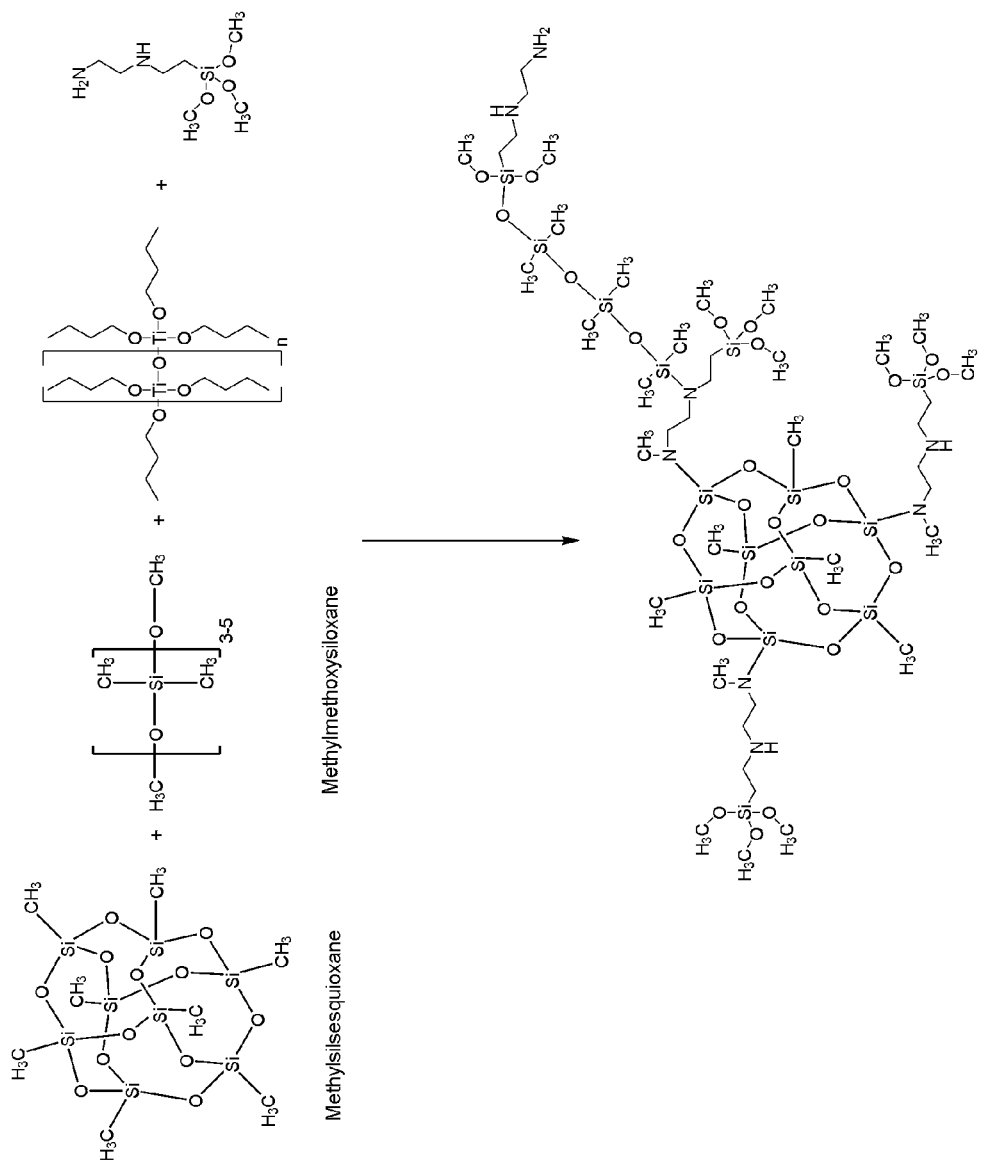
FIG. 13 depicts the reaction of methylsilsesquioxane, N-[3-(trimethoxysilyl)propyl]ethylenediamine, and polymeric butyltitanate. Notably, ladder structures are not predominantly formed from this reaction.
Figure 14:
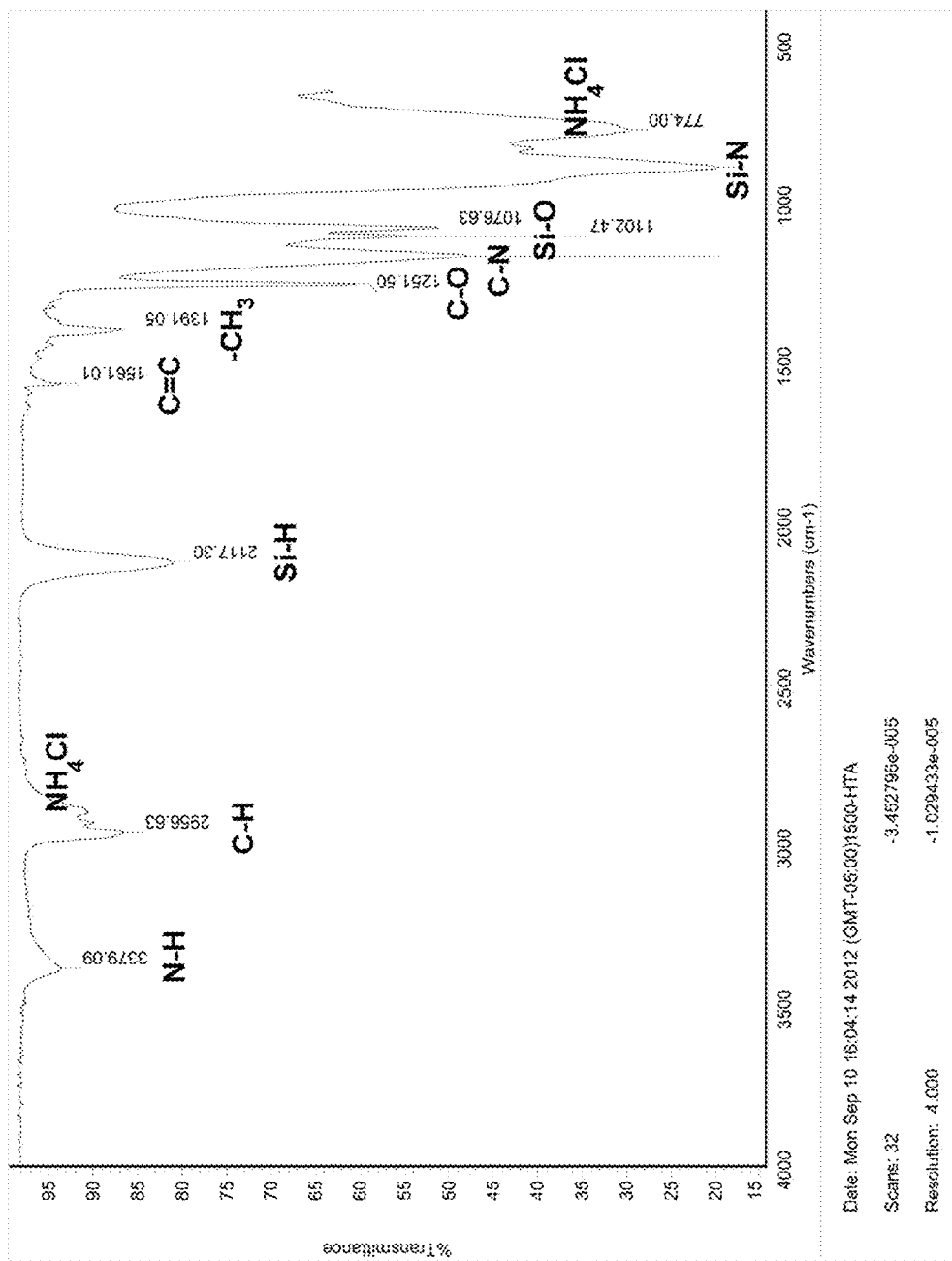
FIG. 14 depicts the FTIR spectrum for a liquid polysiloxazane-based coating resin, as provided by the manufacturer.

The spectrum of the neat mixture of methylsilsesquioxane (1 g) with polymeric butyltitanate (100 mg) and N-[3-(trimethoxysilyl)propyl]ethylenediamine (250 mg) was recorded using ATR detection after 60 minutes of reaction at 25° C. As shown in FIG. 12, the FTIR spectrum had a Si—O—Si vibration at 1185 cm$^{-1}$, which was typical for silsesquioxanes even after 24 hours of reaction. Ladder structures were not predominantly formed from this reaction, as depicted in FIG. 13. The resulting materials were brittle because stable layers were flat. Flat layers were formed by partially opening the silsesquioxanes. The silsesquioxane was not fully opened the amines reacted with the silsesquioxanes before the polymeric butyltitanate could. Thus, reaction with the enhancer was essentially blocked by the prior reaction with the amines. This observation held true for the other amines tested: DT-6020, polyethyleneimine, and 1,3-diaminopropane. In conclusion, and not wishing to be bound by theory, the amine-containing constituents appear to be incompatable with the methylsilsesquioxane/butyltitanate resin system, preventing the formation of the siloxane ladder structures observed in their absence.

Example 4

Reaction of Silsesquioxane with Butyltitanate and Triethoxysilane

Figure 15:
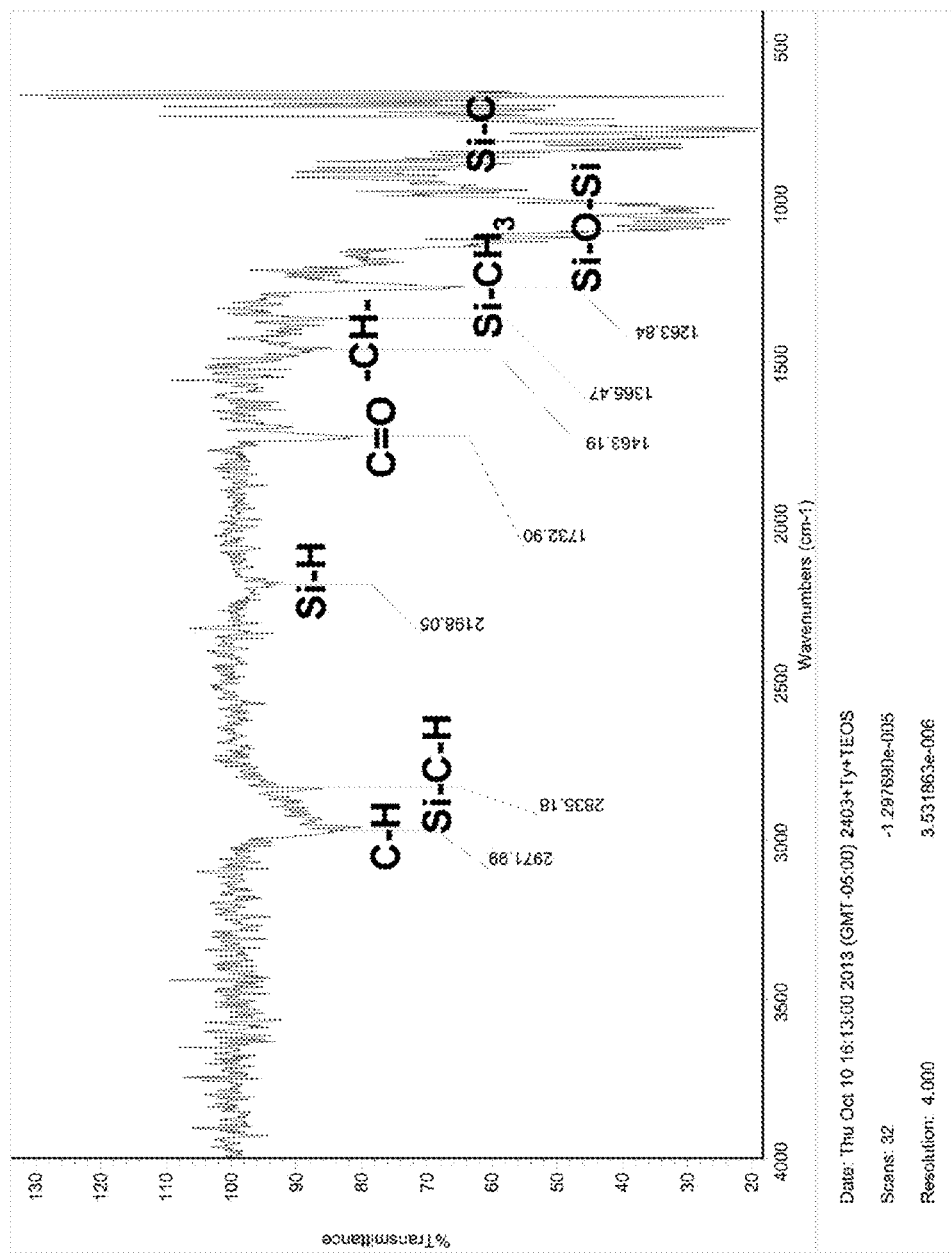
FIG. 15 depicts the FTIR spectrum of a clear coating formed by reaction of methylsilsesquioxane, methoxymethylsiloxane, triethoxysilane, and polymeric butyltitanate. The spectrum indicates the presence of Si—H bonds.
Figure 16:
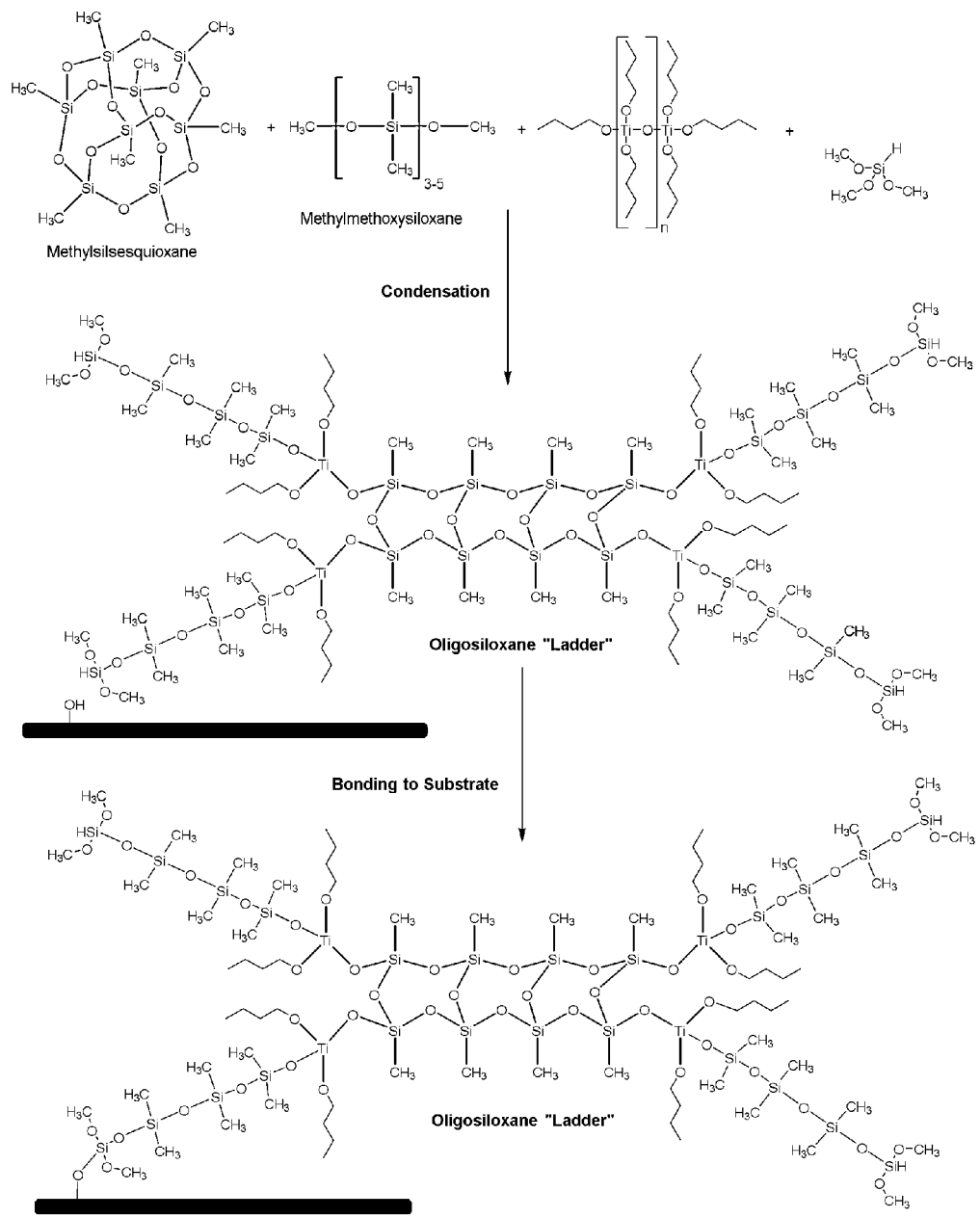
FIG. 16 depicts a reaction scheme of methylsilsesquioxane, methoxymethylsiloxane, triethoxysilane, and polymeric butyltitanate, which resulted in the clear coating.

The addition of a small-molecule silane in the methylsilsesquioxane/butyltitanate resin system was investigated. It was hypothesized that the presence of an Si—H bond would improve properties of the cured coating. Triethoxysilane (TEOS) was added to a mixture of methylsilsesquioxane/methoxymethylsiloxane, and polymeric butyltitanate (5% by weight in n-butanol) at a ratio of 2:8:1 (v/v/v). After about 15 minutes, the mixture provided a very thin and crystal clear coating, which strongly bonded to borosilicate glass. Typically, 80 mg spread out over an area of 1 cm$^2$. All curing experiments were performed at room temperature (25° C.). Curing could proceed for up to about 60 minutes. FIG. 15 depicts the FTIR spectrum of the clear coating, which indicated the presence of a Si—H bond. FIG. 16 depicts the proposed reaction mechanism resulting in the clear coating.

Several other ratios of methylsilsesquioxane, methoxymethylsiloxane, polymeric butyltitanate, and triethoxysilane were also investigated. These compositions are described below in Table 1 along with their hardening times at 65° F. and 350° F., as determined by a scratch test. All samples were prepared in triplicate. The scratch tests were performed in accordance with ASTM Standard G171 (03) (Standard Test Method for Scratch Hardness of Materials Using a Diamond Stylus). Linear scratches were performed and verified by using a Light Microscope (Fisher).

TABLE 1

Silicon-based compositions

| Methysilses-quioxane* | Methyl-methoxy-siloxane | Butyl-titanate | Triethoxy-silane | Hardening time at 65° F. | Hardening time at 350° F. |
|---|---|---|---|---|---|
| 70% | 20% | 5% | 5% | 2 h | 0.33 h |
|  |  | 4% | 6% | 2.5 h | 0.5 h |
|  |  | 3% | 7% | 3 h | 1 h |
|  |  | 2% | 8% | 5 h | 1.66 h |
|  |  | 1% | 9% | 8 h | 3 h |
|  |  | 0.1% | 9.9% | 24 h | 6 h |
| 30% | 50% | 5% | 15% | 4 h | 1 h |
|  |  | 4% | 16% | 5 h | 0.92 h |
|  |  | 3% | 17% | 8 h | 1.66 h |
|  |  | 2% | 18% | 12 h | 2.33 h |
|  |  | 1% | 19% | 15 h | 4 h |
|  |  | 0.1% | 19.9% | 24 h | 5 h |
| 10% |  | 5% | 35% | 5 h | 0.83 h |
|  |  | 4% | 36% | 7 h | 0.75 h |
|  |  | 3% | 37% | 10 h | 1.17 h |
|  |  | 2% | 38% | 14 h | 2 h |
|  |  | 1% | 39% | 16 h | 3.5 h |
|  |  | 0.1% | 39.9% | 23 h | 5 h |
|  | 10% | 5% | 75% | 3.17 h | 0.66 h |
|  |  | 4% | 76% | 3.83 h | 1 h |
|  |  | 3% | 77% | 4.33 h | 1.33 h |
|  |  | 2% | 78% | 4.66 h | 1.83 h |
|  |  | 1% | 79% | 5.5 h | 2.5 h |
|  |  | 0.1% | 79.9% | 11 h | 3 h |

*All percentages are based on weight of the component in the total composition. Times are measured in hours.

Generally the compositions of Table 1 comprised 10-70% (w/w) methylsilsesquioxane, 10-50% (w/w) methylmethoxysiloxane, 0.1-5% (w/w) polymeric butyltitanate, and 10-50% (w/w) triethoxysilane. These compositions all hardened (cured) in less than 24 hours, and some in less than 2 hours. Some compositions even hardened in less than 1 hour. Compositions with components outside these ranges took longer than 24 hours to harden. Surprisingly, the presence of triethoxysilane improved coating adhesion, particularly to glass substrates. In conclusion, and not wishing to be bound by theory, the presence of an Si—H bond within at least one component of the silicon-based composition improved the coating's adhesion property.

Example 5

Reaction of Silsesquioxane with Butyltitanate and Methylphenylsilicone Resin The effect of adding a methylphenylsilicone resin to the methylsilsesquioxane/butyltitanate resin system was also investigated. It was hypothesized that the phenyl groups from the methylphenylsilicone resin would improve properties of the cured coating. Methylphenylsilicone resin provided by Wacker Silres™ SY 409 (500 mg) was dissolved in xylenes (5 mL) and reacted with methylsilsesquioxane (1 g) in the presence of polymeric butyltitanate (100 mg). The reaction mixture was incubated at 150° C. for 30 minutes. The phenyl groups in methylphenylsilicone resin hardened the material, because the planar phenyl rings (—$C_6H_5$) bound to each other through hydrophobic effects and Π-Π electron interactions, as shown below:

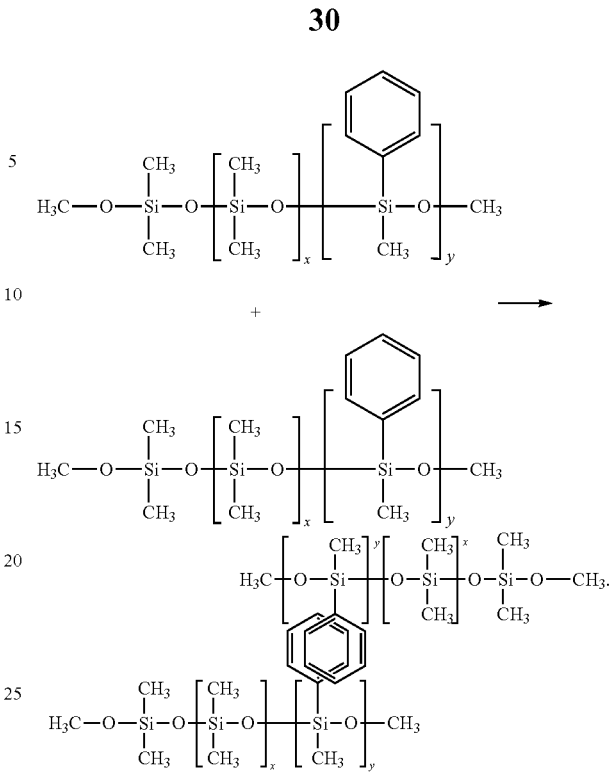

Figure 17:
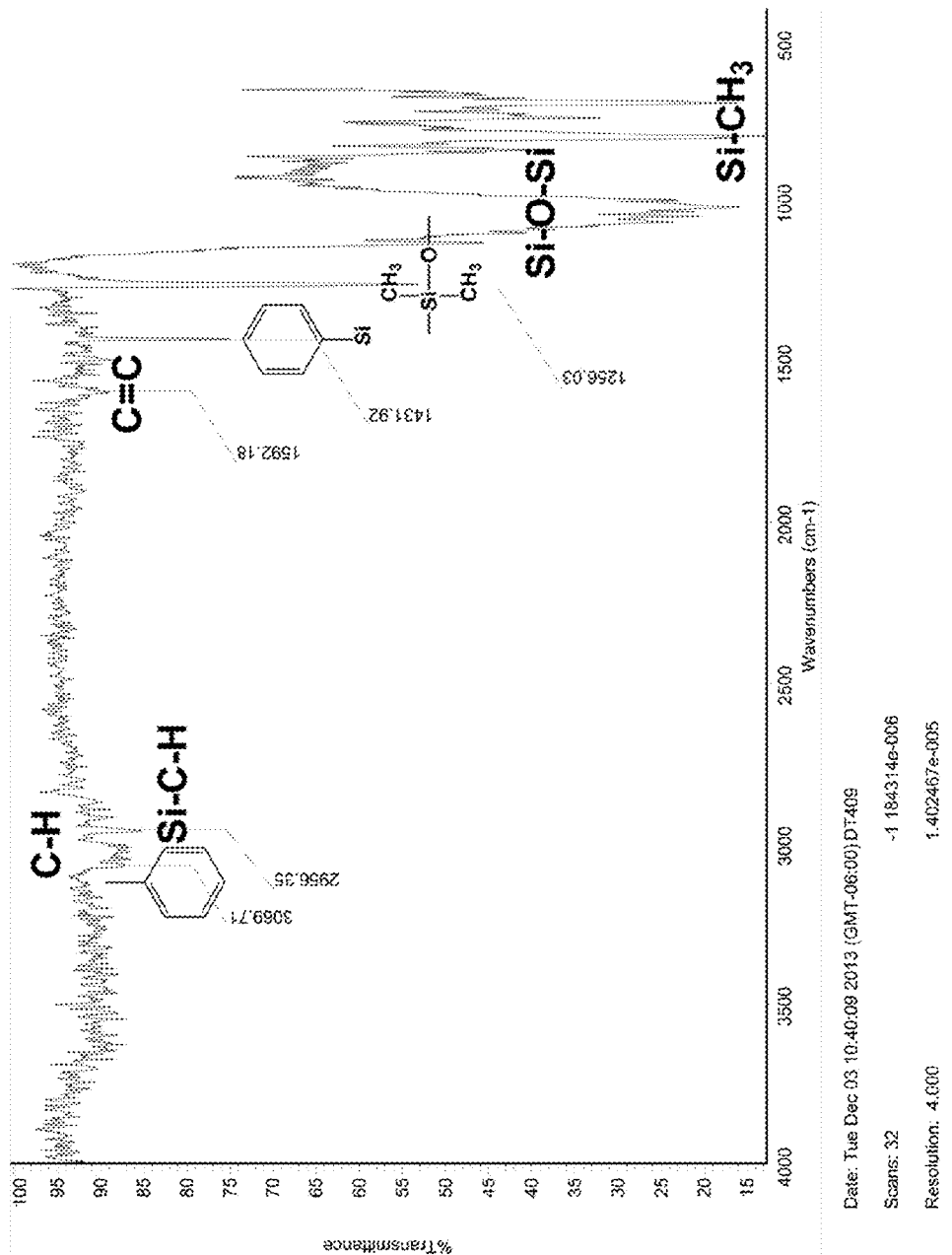
FIG. 17 depicts the FTIR spectrum of a compound formed by reaction of methylsilsesquioxane, a methylphenylsilicone resin, and polymeric butyltitanate.
Figure 18:
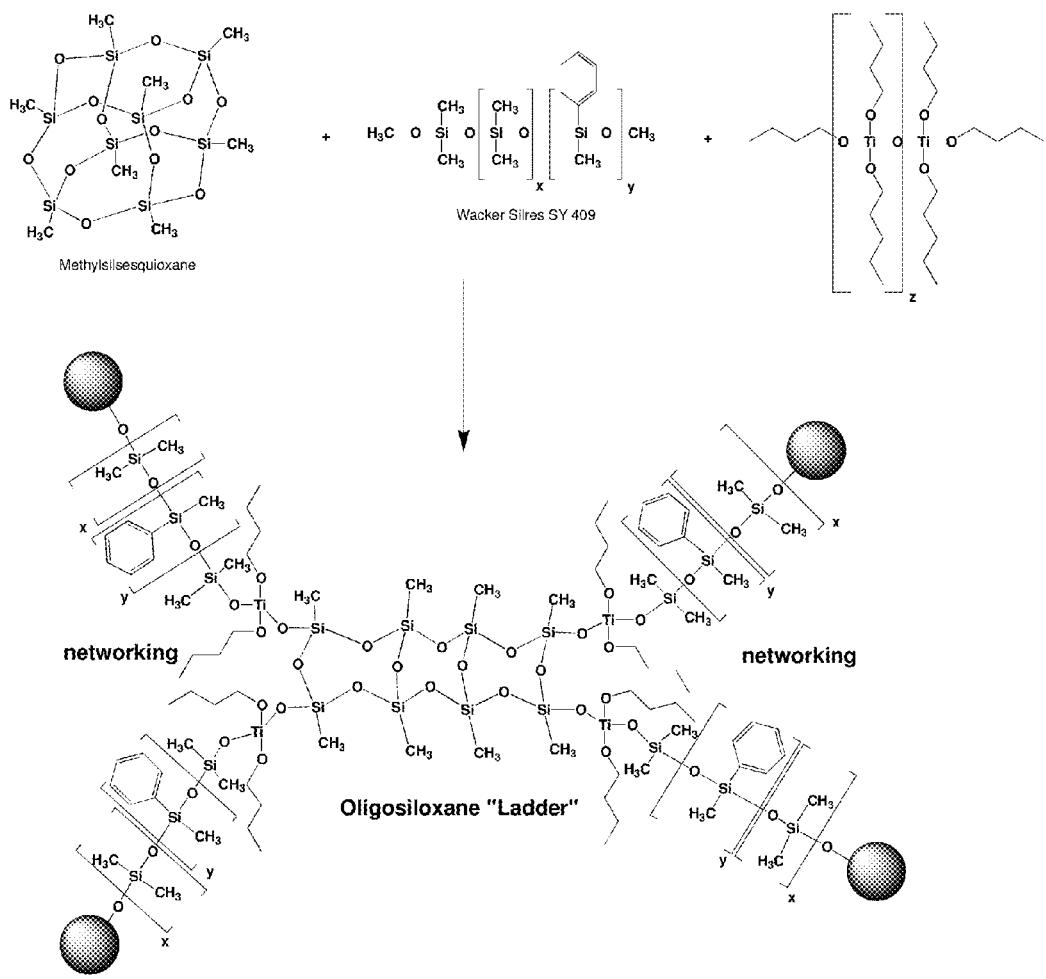
FIG. 18 depicts the formation of oligosiloxane ladders via the controlled ring-opening of methylsilsesquioxanes, enhanced by polymeric butyltitanate in the presence of a methylphenylsilicone resin (Wacker Silres™ SY 409).

The FTIR spectrum of the neat mixture (with no solvents added) was recorded using ATR detection (64 scans) (See FIG. 17). The FTIR spectrum demonstrated all structural elements that were components in the reaction scheme shown at FIG. 18, including the phenyl groups, Si—C—H groups, phenyl-silicon bonds, Si—O—Si groups, and Si—$CH_3$ groups. In conclusion, and not wishing to be bound by theory, this approach led to superior coatings, via oligosiloxane ladders formed through the controlled ring-opening of methylsilsesquioxanes enhanced by polymeric butyltitanate in the presence of a methylphenylsilicone resin.

Example 6

Comparison of Compositions Based on Silsesquioxane and Butyltitanate and Methylphenylsilicone Resin To observe the differences between the silicon-based compositions described herein and commercially available resin systems, compositions based on mixtures of silsesquioxanes and methylmethoxysiloxanes described above in Examples 1-5 to a commercially available liquid polysiloxazane-based coating were compared. The spectrum of the neat mixture (no solvents added) of the liquid polysiloxazane was recorded using ATR detection (64 scans). According to the FTIR spectrum (FIG. 15), the vinyl groups in the liquid polysiloxazane partially polymerized during the synthesis, forming an incomplete carbon backbone. The two different backbones (—Si—N—Si— and —CHR—$CH_2$—) interfered with the polymer's adhesion of the polymer to the surface. In comparison, the molecular network formed from silsesquioxane and methoxymethylsiloxane mixture comprised Si—O—Si bonds, as depicted in their FTIR spectra. The bond strength of Si—O bond is 798 kJ/mol, but the strength of the Si—N bond is only 439 kJ/mol.

In conclusion, and not wishing to be bound by theory, coatings derived from mixtures of silsesquioxane and methoxymethylsiloxane were stronger and more resistant to mechanical damage and chemical attack than were silazane-based coatings, as calculated from the bond strengths present in the polumerized material. In particular, coatings derived from silsesquioxane and methoxymethylsiloxane were estimated to be more resistant against UV irradiation and more stable against oxidation, compared to polysilazanes, which are known to polymerize under UV and too slowly oxidize.

Example 7

Reaction of Silsesquioxane, Butyltitanate, and Methylphenylsilicone with Silicon Compounds To produce resins with good solvent resistance at a ambient curing conditions, additional silicon compounds were investigated with the mixture of silsesquioxane, butyltitanate, and methylmethoxysiloxane. Methylsilsesquioxane/methylmethoxysiloxane resin (Dow Corning CF2403 liquid resin base at 100 parts by weight), methylphenylsilicone resin (Wacker Silres™ SY 409 at 15 parts by weight), triethoxysilane (Wacker TES 28 at 3.2 parts by weight), and DT-6060 (100 parts by weight) were combined to form a mixture. DT-6060 comprises about 3% (w/w) polydimethylsiloxane fluid, about 4% (w/w) polysilane, and about 93% (w/w) isopropyl acetate/amyl acetate. The methylphenylsilicone resin was included in the mixture to help prevent cracking in the cured resin.

This mixture was diluted with either 20 parts by weight of tert-butyl acetate (TBAc™, Lyondell Basell), isopropyl acetate, or isoalkanes (hydrotreated heavy naphtha, Isopar™ G, ExxonMobil), depending on the desired drying time of the mixture during curing. Also added to the mixture was a butyltitanate curing enhancer: 8.2 parts by weight polymeric butyltitanate (Tyzor™ TBP) to 19 parts tert-butyl acetate or isopropyl acetate; 5.7 parts by weight (5% w/w) monomeric butyltitante (Tyzor™ TnBP); or 1.7 parts by weight (0.5 to 2% w/w) monomeric butyltitante. The polymeric butyltitanate is very viscous and is easier to handled if thinned with solvent.

The formulae using 5% (w/w) butyltitanate cured to a solvent resistant coating at a 250° F. within about one hour under atmospheric conditions. The formulae using 1% (w/w) butyltitanate cured gives a good solvent resistance at a 150° F. within about 2 hours under atmospheric conditions.

While specific embodiments have been described above with reference to the disclosed embodiments and examples, such embodiments are only illustrative and do not limit the scope of the disclosure. Changes and modifications can be made in accordance with ordinary skill in the art without departing from the disclosure in its broader aspects as defined in the following claims.

What is claimed is:

1. A silicon-based composition, which after curing is a coating composition having strong substrate adhesion, scratch resistance, and solvent resistance, the composition formed from a mixture of constituents comprising:
   from about 20% to about 90% (w/w, of the total composition) of a first siloxane consisting of methylsilsesquioxane and an α, ω methoxy-terminated polydimethylsiloxane, wherein the α, ω methoxy-terminated polydimethylsiloxane is at least 10% (w/w, of the total composition); and
   from about 10% to about 80% (w/w, of the total composition) of one or more silicon compounds selected from the group consisting of a second siloxane, silane, and silazane.

2. The composition of claim 1, wherein the first siloxane consists of from about 10% to about 70% (w/w, of the total composition) methylsilsesquioxane and from about 10% to about 50% (w/w, of the total composition) α, ω methoxy-terminated polydimethylsiloxane.

3. The composition of claim 1, further comprising from about 0.1% to about 5% (w/w, of the total composition) alkyltitanate.

4. The composition of claim 3, wherein the alkyltitanate comprises butyltitanate present in an amount ranging from about 0.5% to about 2% (w/w, of the total composition).

5. The composition of claim 3, comprising one or more silicon compounds from about 10% to about 50% (w/w, of the total composition).

6. The composition of claim 3, comprising silane selected from the group consisting of trimethoxysilane, triethoxysilane, aminopropylsilane, and polysilane.

7. The composition of claim 3, wherein the one or more silicon compounds comprises methylphenylsilicone resin.

8. The composition of claim 1, wherein
   the silicon compound comprises a combination of from about 10% to about 50% (w/w, of the total composition) triethoxysilane, and from about 10% to about 20% (w/w, of the total composition) methylphenylsilicone resin; and
   an alkyltitanate comprising from about 0.5% to about 2% (w/w, of the total composition) butyltitanate.

9. A polymer formed from the polymerization of a mixture comprising a first siloxane consisting of methylsilsesquioxane and α, ω-methoxy-terminated polydimethylsiloxane; and one or more silicon compounds selected from the group consisting of a second siloxane, silane, and silazane;
   the polymer comprising:
   a siloxane ladder structure comprising a repeating unit of formula (I),

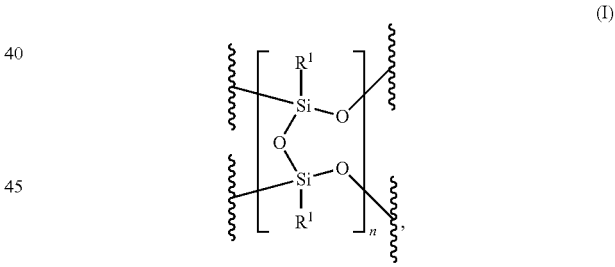

(I)

wherein each $R^1$ is hydrocarbyl, and wherein n is between 4 and 100.

10. The polymer of claim 9, wherein $R^1$ is alkyl.
11. The polymer of claim 9, wherein $R^1$ is methyl.
12. A compound comprising formula (II),

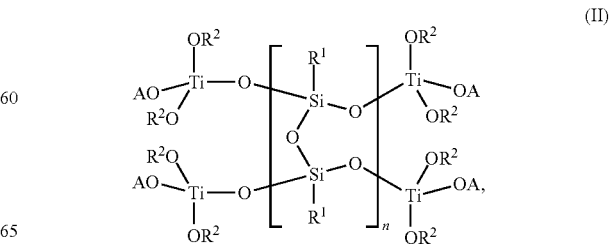

(II)

wherein:
each $R^1$ is hydrocarbyl;
each $R^2$ is alkyl;
each A is selected from the group consisting of

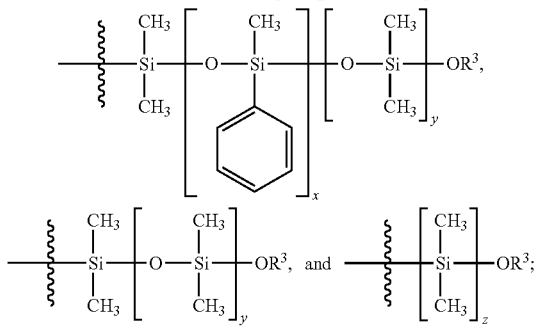

each $R^3$ is selected from the group consisting of alkyl and $SiH(OR^4)_2$;
each $R^4$ is selected from the group consisting of methyl and ethyl;
n is between 4 and 100; and
x, y, and z are each between 1 and 100.

13. The compound of claim 12, wherein each $R^1$ is methyl.

14. The compound of claim 12, wherein each $R^2$ is butyl.

15. The compound of claim 12, wherein x, y, and z are each between 5 and 25.

16. The compound of claim 12, wherein the compound of formula (II) comprises a compound of formula (III):

(III)

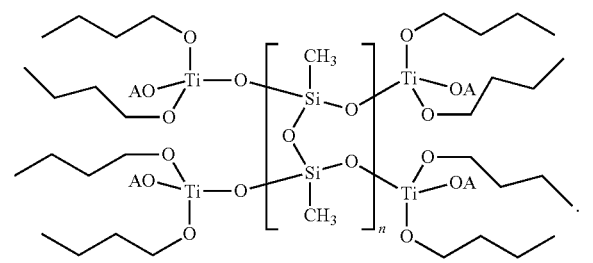

17. A method of coating a surface, which method comprises:
(a) mixing silicon-based constituents to form a silicon-based coating composition comprising:
from about 20% to about 90% (w/w, of the total composition) of a first siloxane consisting of methylsilsesquioxane and α, ω methoxy-terminated polydimethylsiloxane, wherein the α, ω methoxy-terminated polydimethylsiloxane is at least 10% (w/w, of the total composition); and
from about 10% to about 80% (w/w, of the total composition) of one or more silicon compounds selected from the group consisting of a second siloxane, silane, and silazane;
(b) coating the mixture onto a surface; and
(c) curing the coating at a temperature from about 20° C. to about 400° C. for about 0.3 hours to about 5 hours.

18. The method of claim 17, wherein the first siloxane consists of from about 10% to about 70% (w/w, of the total composition) methylsilsesquioxane and from about 10% to about 50% (w/w, of the total composition) α, ω methoxy-terminated polydimethylsiloxane; and wherein, the silicon compound comprises a combination of from about 10% to about 50% (w/w, of the total composition) triethoxysilane, and from about 10% to about 20% (w/w, of the total composition) methylphenylsilicone resin.

19. The method of claim 17, wherein the silicon-based coating composition further comprises from about 0.1% to about 5% (w/w, of the total composition) alkyltitanate.

20. The method of claim 19, wherein the alkyltitanate comprises from about 0.5% to about 2% (w/w, of the total composition) butyltitanate.

21. The method of claim 17, wherein the coating is cured at a temperature of about 300° C. to about 400° C. for about 0.3 hours to about 5 hours to form the coating composition.

* * * * *